US012706404B2

(12) United States Patent
Yang et al.

(10) Patent No.: US 12,706,404 B2
(45) Date of Patent: Aug. 11, 2026

(54) RELIABLE CARD EDGE CONNECTOR WITH NARROW LATCH

(71) Applicant: Amphenol Commercial Products (Chengdu) Co., Ltd., Chengdu (CN)

(72) Inventors: Kui Yang, Chengdu (CN); Xiaodong Hu, Chengdu (CN)

(73) Assignee: Amphenol Commercial Products (Chengdu) Co., Ltd., Chengdu (CN)

( * ) Notice: Subject to any disclaimer, the term of this patent is extended or adjusted under 35 U.S.C. 154(b) by 442 days.

(21) Appl. No.: 18/346,155

(22) Filed: Jun. 30, 2023

(65) Prior Publication Data

US 2024/0014585 A1 Jan. 11, 2024

(30) Foreign Application Priority Data

Jul. 6, 2022 (CN) ......................... 202221748497.1

(51) Int. Cl.

| | |
|---|---|
| ***H01R 12/72*** | (2011.01) |
| ***H01R 12/70*** | (2011.01) |
| ***H01R 13/627*** | (2006.01) |

(52) U.S. Cl.

CPC ....... *H01R 12/721* (2013.01); *H01R 12/7005* (2013.01); *H01R 13/6273* (2013.01)

(58) Field of Classification Search

CPC .............. H01R 12/721; H01R 13/6273; H01R 12/7005; H01R 12/737; H01R 12/716

(Continued)

(56) References Cited

U.S. PATENT DOCUMENTS 5,389,000 A * 2/1995 DiViesti ............. H01R 12/7005 439/328
7,607,949 B2 10/2009 Hsu (Continued)

FOREIGN PATENT DOCUMENTS

CN 202633554 U 12/2012
CN 203660106 U 6/2014

(Continued)

OTHER PUBLICATIONS

He et al., Reliable, Robust Card Edge Connector, U.S. Appl. No. 18/133,601, filed Apr. 12, 2023.

(Continued)

*Primary Examiner* — Abdullah A Riyami
*Assistant Examiner* — Amara Anderson
(74) *Attorney, Agent, or Firm* — Wolf, Greenfield & Sacks, P.C.

(57) ABSTRACT

A card edge connector that provides reliable performances while satisfying smaller dimensions required by industry standards. The connector has a housing holding terminals. The housing has a body, a tower narrower than the body, and a slot extending from the body to the tower. The tower has a tower body protruding from an end of the body of the housing and an extension protruding from the tower body away from the slot. The connector has a latch pivotably connected to the housing. The latch has a recess configured to receive the extension of the tower. The connector has a reinforcing member between the tower body and the extension. Such a configuration enables the tower and/or the latch to be narrower such that more components can be disposed in a system in which the connector is disposed, while strong enough to sustain various operating conditions of the system.

20 Claims, 11 Drawing Sheets

(58) Field of Classification Search
USPC .......................................................... 439/296
See application file for complete search history.

(56) References Cited

U.S. PATENT DOCUMENTS

| | | | | |
|---|---|---|---|---|
| 7,637,783 | B2 | 12/2009 | Sasaoka et al. | |
| 7,677,907 | B2 | 3/2010 | Guan et al. | |
| 7,731,541 | B1 | 6/2010 | Lee et al. | |
| 7,892,006 | B2 | 2/2011 | Guan et al. | |
| 7,972,171 | B2 | 7/2011 | Teh | |
| 8,142,207 | B1 | 3/2012 | Ljubijankic et al. | |
| 8,187,031 | B2 | 5/2012 | Li et al. | |
| 8,403,689 | B2 | 3/2013 | Li et al. | |
| 8,535,077 | B2 | 9/2013 | Shen et al. | |
| 8,721,350 | B2 | 5/2014 | Liu et al. | |
| 9,166,317 | B2 | 10/2015 | Briant et al. | |
| 9,325,090 | B2 | 4/2016 | Shen et al. | |
| 9,431,734 | B2 | 8/2016 | Guo et al. | |
| 9,685,723 | B2 | 6/2017 | Kee Mew | |
| 9,887,485 | B2 | 2/2018 | Lambie et al. | |
| 10,103,476 | B1 | 10/2018 | Qiu et al. | |
| 10,135,165 | B2 | 11/2018 | Zuo | |
| 10,224,653 | B2 | 3/2019 | Niu et al. | |
| 10,461,467 | B2 | 10/2019 | Eppley et al. | |
| 10,741,944 | B2 | 8/2020 | Long | |
| 10,855,020 | B1 | 12/2020 | Phillips et al. | |
| 10,916,894 | B2 | 2/2021 | Kirk et al. | |
| 11,374,340 | B2 * | 6/2022 | Tang ...................... | H01R 13/46 |
| 11,545,769 | B2 | 1/2023 | Comerci et al. | |
| 11,637,391 | B2 | 4/2023 | Guo et al. | |
| 11,710,923 | B2 | 7/2023 | Hu et al. | |
| 2010/0075538 | A1 | 3/2010 | Ohshida | |
| 2011/0021080 | A1 | 1/2011 | Kamiya et al. | |
| 2011/0065297 | A1 | 3/2011 | Guan et al. | |
| 2011/0136388 | A1 | 6/2011 | Fu et al. | |
| 2011/0275238 | A1 | 11/2011 | Iijima et al. | |
| 2012/0178274 | A1 * | 7/2012 | Manickam ......... | H01R 12/7005 439/157 |
| 2012/0202387 | A1 | 8/2012 | McNamara | |
| 2012/0329301 | A1 * | 12/2012 | Li ........................ | H01R 12/721 439/157 |
| 2013/0280926 | A1 | 10/2013 | Ono | |
| 2016/0020540 | A1 | 1/2016 | Shen et al. | |
| 2016/0118736 | A1 | 4/2016 | Hoyack et al. | |
| 2016/0190724 | A1 | 6/2016 | Mito | |
| 2016/0336667 | A1 | 11/2016 | Kee Mew | |
| 2017/0302031 | A1 | 10/2017 | Cheng et al. | |
| 2018/0198220 | A1 | 7/2018 | Sasame et al. | |
| 2019/0165518 | A1 | 5/2019 | Hsu et al. | |
| 2019/0173209 | A1 | 6/2019 | Lu et al. | |
| 2019/0173232 | A1 | 6/2019 | Lu et al. | |
| 2019/0199023 | A1 | 6/2019 | Soh | |
| 2020/0076131 | A1 | 3/2020 | Hu et al. | |
| 2020/0076135 | A1 | 3/2020 | Tang et al. | |
| 2020/0203867 | A1 | 6/2020 | Lu | |
| 2021/0288423 | A1 | 9/2021 | Guo et al. | |
| 2021/0351529 | A1 | 11/2021 | Yang et al. | |
| 2021/0376508 | A1 | 12/2021 | Hu | |
| 2022/0037828 | A1 | 2/2022 | Hu et al. | |
| 2022/0069496 | A1 | 3/2022 | Yi et al. | |
| 2022/0181809 | A1 | 6/2022 | Xie et al. | |
| 2022/0181811 | A1 | 6/2022 | Liu et al. | |
| 2022/0247107 | A1 | 8/2022 | Tang et al. | |
| 2023/0096092 | A1 | 3/2023 | Hu | |
| 2023/0126150 | A1 | 4/2023 | Yang et al. | |
| 2023/0163500 | A1 | 5/2023 | Yang et al. | |
| 2023/0178916 | A1 | 6/2023 | Yang et al. | |
| 2023/0238724 | A1 | 7/2023 | Yang et al. | |

FOREIGN PATENT DOCUMENTS

| | | | |
|---|---|---|---|
| CN | 105703103 | A | 6/2016 |
| CN | 108539464 | A | 9/2018 |
| CN | 212874843 | U | 4/2021 |
| CN | 214505858 | U | 10/2021 |
| TW | 200835073 | A | 8/2008 |
| TW | M475740 | U | 4/2014 |

OTHER PUBLICATIONS

Yang et al., Field Installable Card Edge Connector, U.S. Appl. No. 18/101,998, filed Jan. 26, 2023.
Yang et al., Robust Card Edge Connector, U.S. Appl. No. 18/346,150, filed Jun. 30, 2023.
[No Author Listed], DDR5 Memory Module Sockets (SMT). Storage & Server IO. Amphenol ICC. 2022. 2 pages. URL:https://cdn.amphenol-cs.com/media/wysiwyg/files/documentation/datasheet/ssio/ssio_ddr5_smt.pdf [last accessed Mar. 22, 2022].
[No Author Listed], DDR5 SDRAM—Wikipedia. Aug. 8, 2021. 6 pages. URL:https://en.wikipedia.org/wiki/DDR5_SDRAM [last accessed on Aug. 16, 2021].
[No Author Listed], MCIO 124pos 85ohm. Amphenol Assembletech. 1 page. URL:http://www.amphenol-ast.com/v3/en/overview.aspx?classId=234 [retrieved on Apr. 11, 2022].
[No Author Listed], Mini Cool Edge IO—The Ideal Solution to Transmit Next Generation High-Speed Signal to Designated Area in Your System. Jul. 25, 2018. 2 pages. URL:https://www.amphenol-icc.com/connect/mini-cool-edge-io-the-ideal-solution-to-transmit-next-generation-high-speedsignal.html [retrieved on Apr. 11, 2022].
[No Author Listed], Mini Cool Edge IO Connector. Commercial IO. Amphenol ICC. 2022. 5 pages. URL:https://cdn.amphenol-icc.com/media/wysiwyg/files/documentation/datasheet/inputoutput/io_mini_cool_edge_io.pdf [retrieved on Apr. 11, 2022].
Armasu, What We Know About DDR5 So Far. Jun. 7, 2019. 20 pages. URL:https://www.tomshardware.com/news/what-we-know-ddr5-ram,39079.html [last accessed Jul. 21, 2022].
U.S. Appl. No. 17/540,062, filed Dec. 1, 2021, Liu et al.
U.S. Appl. No. 17/331,414, filed May 26, 2021, Hu et al.
U.S. Appl. No. 17/386,252, filed Jul. 27, 2021, Hu et al.
U.S. Appl. No. 17/402,255, filed Aug. 13, 2021, Yi et al.
U.S. Appl. No. 17/950,364, filed Sep. 22, 2022, Hu.
U.S. Appl. No. 17/973,913, filed Oct. 26, 2022, Yang et al.
U.S. Appl. No. 17/988,330, filed Nov. 16, 2022, Yang et al.
U.S. Appl. No. 18/075,246, filed Dec. 5, 2022, Yang et al.
U.S. Appl. No. 18/101,998, filed Jan. 26, 2023, Yang et al.
U.S. Appl. No. 18/133,601, filed Apr. 12, 2023, He et al.
U.S. Appl. No. 18/346,150, filed Jun. 30, 2023, Yang et al.

* cited by examiner

RELIABLE CARD EDGE CONNECTOR WITH NARROW LATCH

RELATED APPLICATIONS

This application claims priority to and the benefit of Chinese Patent Application Serial No. 202221748497.1, filed on Jul. 6, 2022, entitled "CARD EDGE CONNECTOR." The contents of this application are incorporated herein by reference in their entirety.

FIELD

This application relates to interconnection systems, such as those including electrical connectors, configured to interconnect electronic assemblies.

BACKGROUND

Electrical connectors are used in many electronic systems. It is generally easier and more cost effective to manufacture a system as several circuit boards, which may be joined together with electrical connectors than to manufacture the system as a single assembly. A known arrangement for joining several printed circuit boards may have one printed circuit board as a backplane. Then, other circuit boards called daughter boards or daughter cards are connected to the backplane by electrical connectors to interconnect these circuit boards.

Card edge connectors, as electrical connectors, have been widely applied to electronic products, such as computers. The card edge connectors are used to connect electronic cards, such as memory cards, graphics cards and sound cards, to circuit boards, so that the electronic cards can provide memory capacity for the electronic products and/or enhance operating speeds of the electronic products and other related performances thereof. Card edge connectors that receive these add-in cards may be configured for surface mounting to the circuit board, such as using a reflow soldering technique.

Card edge connectors may have pivotable latches, and the latches may be pivoted to unlocked positions when the electronic cards are expected to be inserted into or pulled out from the card edge connectors. After the electronic cards are mounted onto the card edge connectors, the latches may be pivoted to locked positions where the electronic cards are locked to the card edge connectors.

Card edge connectors of this type may be configured, for example, to receive an add-in card for a computer that contains memory chips. Such memory cards may be implemented according to a standard, such as DDR4 or DDR5. Certain aspects of the card edge connector would then also comply with the standard, such as the length and width of a slot that receives the card or the position of the head of the latch relative to the slot. According to a narrow-latch DDR standard for example, it is desirable for a latch to be less than 4.2 mm wide. The standard, however, does not define how such a latch may be implemented.

BRIEF SUMMARY

Aspects of the present application relate to card edge connectors.

Some embodiments relate to a card edge connector. The card edge connector may comprise a housing comprising a body, a tower, and a slot extending from the body to the tower, the tower comprising: a tower body protruding from an end of the body of the housing, and an extension protruding from the tower body away from the slot; and a latch comprising a lower portion pivotably connected to the body of the housing such that the latch can move between a locked position and an unlocked position, and an upper portion extending from the lower portion, the upper portion comprising a recess configured to receive the extension of the tower when the latch is in the locked position.

Optionally, the extension of the tower may comprise concave surfaces on opposite sides; the upper portion of the latch may comprise convex surfaces disposed in the recess; and the convex surfaces of the upper portion of the latch may be configured to snap into respective concave surfaces of the extension of the tower when the latch is in the locked position.

Optionally, the upper portion of the latch may comprise a pair of beams disposed on opposite sides of the recess; and the pair of beams may comprise the convex surfaces.

Optionally, the extension of the tower may comprise a pair of protrusions spaced apart; the upper portion of the latch may comprise a pair of bulges; and each of the pair of protrusions of the tower may be configured to engage a respective one of the pair of bulges when the latch may be in the locked position.

Optionally, the extension of the tower may comprise a pair of reinforcing walls; and each of the pair of reinforcing walls may be connected to the tower body and a respective one of the pair of protrusions.

Optionally, the pair of reinforcing walls of the extension of the tower may comprise surfaces facing the latch and inclined toward the slot of the housing; the latch may comprise slanted surfaces disposed in the recess; and each of the surfaces of the pair of reinforcing walls of the extension of the tower may be configured to abut against a respective one of the slanted surfaces of the latch when the latch is in the locked position.

Optionally, for the housing: the tower may be narrower than the body in a transverse direction.

Optionally, the upper portion of the latch may comprise a pair of bulges; the extension of the tower may comprise a pair of grooves on opposite sides; and the pair of grooves may be configured to receive respective ones of the pair of bulges.

Optionally, the tower body may be integrally formed with the body of the housing.

Optionally, the extension may be a separate component, and/or may comprise different material than the tower body.

Some embodiments relate to a latch for a card edge connector. The latch may comprise a lower portion comprising a pair of pivot portions configured to engage matching recesses of a housing for the connector such that the latch may be pivotably connected to the housing; an upper portion extending from the lower portion, the upper portion comprising a recess and a pair of bulges disposed in the recess; and a heat dissipation hole extending through at least a portion of the lower portion and a portion of the upper portion.

Optionally, each bulge of the pair of bulges may comprise a first bulge sidewall and a second bulge sidewall; and the first bulge sidewall and the second bulge sidewall extend at an angle to each other.

Optionally, each bulge of the pair of bulges may comprise a first surface joining the first bulge sidewall and the second bulge sidewall, and a second surface opposite to the first surface and joining the first bulge sidewall and the second bulge sidewall; and the second surface inclines toward the first surface.

Some embodiments relate to a card edge connector. The card edge connector may comprise a housing comprising a body, a tower, and a slot extending from the body to the tower, the tower comprising a tower body protruding from an end of the body of the housing and an extension protruding from the tower body away from the slot; a reinforcing member between the tower body and the extension of the tower; and a latch pivotably connected to the body of the housing, the latch comprising a recess configured to receive the extension of the tower. Optionally, the reinforcing member may comprise a reinforcing body; a section of the reinforcing member may be in a U shape; and an end of the slot extends into an opening of the U shape.

Optionally, the tower body may comprise a lower portion and an upper portion extending from the lower portion, the lower portion extending toward the latch beyond the upper portion; the extension may be connected to both the upper portion and the lower portion of the tower body; and the reinforcing member may be inserted between the upper portion of the tower body and the extension.

Optionally, the upper portion of the tower body may comprise: a first pillar and a second pillar disposed on opposite sides of the slot, and an end wall separated from the first pillar and the second pillar by a gap; the extension of the tower may extend from the end wall of the upper portion of the tower body; and a bottom of the U shape may be inserted into the gap, and two sides of the U shape may respectively surround and abut against the first pillar and the second pillar.

Optionally, the first pillar and the second pillar may be offset from outer side surfaces of the lower portion of the tower body such that the two sides of the U shape may be flush with the outer side surfaces of the lower portion of the tower body.

Optionally, the reinforcing member further may comprise a pair of front walls; and the pair of front walls may extend from two ends of the U shape toward each other.

Optionally, the reinforcing member further may comprise: a first hook and a second hook protruding from the front walls, and a third hook protruding from a bottom of the U shape; and the tower may comprise a first recess, a second recess, and a third recess configured to receive the first hook, the second hook, and the third hook, respectively.

Some embodiments relate to a card edge connector. The card edge connector may comprise an insulating housing and a latch. The insulating housing may include a body extending along a longitudinal direction and a tower protruding from an end of the body along a first vertical direction. The first vertical direction is a vertical direction perpendicular to the longitudinal direction. The latch may be pivotably connected to the body between a locked position and an unlocked position for locking and releasing an electronic card connected to the insulating housing respectively. The tower may be provided with a extension, an upper portion of the latch may be provided with a limit recess, and the extension may engage with the limit recess when the latch is in the locked position.

Optionally, the latch may include a latch body and a pair of beams protruding from the latch body along the longitudinal direction. The latch body may be pivotably connected to the body between the locked position and the unlocked position. The pair of beams may be spaced apart along a transverse direction which is perpendicular to the longitudinal direction and the vertical direction. The limit recess may be enclosed and formed by the latch body and the pair of beams.

Optionally, two sides, opposed to each other in the vertical direction, of the pair of beams may be spaced apart from the latch body.

Optionally, two sides, opposed to each other in a transverse direction perpendicular to the longitudinal direction and the vertical direction, of the extension may be provided with grooves respectively. A pair of inner side surfaces of the limit recess may be provided with bulges respectively. The grooves may engage with the bulges correspondingly when the latch is in the locked position.

Optionally, each of the grooves may have a first groove sidewall and a second groove sidewall both extending along the vertical direction. The first groove sidewall may be closer to the outer side of the insulating housing relative to the second groove sidewall along the longitudinal direction, and a sharp angle between the first groove sidewall and the transverse direction may be greater than that between the second groove sidewall and the transverse direction.

Optionally, two side, opposed to each other in the transverse direction, of the extension may be provided with guiding slopes respectively. The guiding slopes may be closer to the outer side of the insulating housing relative to the grooves along the longitudinal direction and approach to each other in a direction away from the grooves. The bulges may be configured to slide over respective guiding slopes when the latch is pivoted toward the locked position.

Optionally, each of the bulges may have a first bulge sidewall and a second bulge sidewall. The first bulge sidewall may be closer to the inner side of the insulating housing relative to the second bulge sidewall along the longitudinal direction. A sharp angle between the first bulge sidewall and the transverse direction may be greater than that between the second bulge sidewall and the transverse direction.

Optionally, the first bulge sidewall may have an equivalent slope to the guiding slope.

Optionally, the grooves may run through the extension along the first vertical direction.

Optionally, a dimension of the bulges in the vertical direction may gradually decrease along the longitudinal direction toward the inner side of the insulating housing.

Optionally, each of the bulges may have a first surface facing the first vertical direction and a second surface facing away from the first vertical direction. The first surface may extend along the longitudinal direction, and the second surface may incline to the first surface along a direction toward the inner side of the insulating housing.

Optionally, the tower may include a tower body and a pair of protrusions protruding from the tower body along the longitudinal direction toward the latch. The pair of protrusions may be spaced apart along a transverse direction perpendicular to the longitudinal direction and the vertical direction. The pair of protrusions may form the extension, and the outer sides of the pair of protrusions may engage with the limit recess.

Optionally, the tower further may include a pair of reinforcing walls. The pair of reinforcing walls may be in one-to-one correspondence with the pair of protrusions. Each of the reinforcing walls and a corresponding protrusion may be arranged successively along the first vertical direction. Each of the reinforcing walls may be connected between the corresponding protrusion and the tower body.

Optionally, the pair of reinforcing walls may have abutting surfaces facing the latch. The abutting surfaces may incline toward the inner side of the insulating housing along a second vertical direction opposite to the first vertical direction. The latch may be provided with a slanted surface matched with the abutting surfaces. The slanted surface may be in the limit recess, and the abutting surfaces may abut against the slanted surface when the latch is in the locked position.

Optionally, dimensions of the latch and the tower in the transverse direction may be less than that of the body.

Optionally, the card edge connector further may include a reinforcing member which is disposed in the tower.

Optionally, a slot may be provided in the insulating housing. The slot may extend to the tower from the body along the longitudinal direction. The reinforcing member may include a reinforcing body. The section of the reinforcing member perpendicular to the vertical direction may be in a U shape, and an end of the slot may extend into an opening of the U shape.

Optionally, the tower may include a tower body, and the extension and the reinforcing member may be disposed successively in an upper portion of the tower body along the longitudinal direction.

Optionally, the extension may be connected to the upper portion of the tower body and a lower portion of the tower body. The lower portion of the tower body may protrude toward the latch beyond the upper portion of the tower body, so that the engagement of the extension and the limit recess may have a projection along the vertical direction which at least partially coincides with that of the lower portion of the tower body.

Optionally, the upper portion of the tower body may include a first pillar and a second pillar on two sides of the slot opposed to each other in a transverse direction perpendicular to the longitudinal direction and the vertical direction. Also the upper portion of the tower body may include an end wall spaced apart from the first pillar and the second pillar along the longitudinal direction to form a gap. The extension may be disposed on the end wall. A bottom of the U shape may be inserted into the gap, and two sides of the U shape may respectively surround and abut against the first pillar and the second pillar.

Optionally, the first pillar and the second pillar may be spaced apart from the outer side surfaces of the lower portion of the tower body along the transverse direction respectively, so that the two sides of the U shape may be flush with the outer side surfaces of the lower portion of the tower body.

Optionally, the reinforcing member may further include a pair of front walls, which may extend from two ends of the U shape toward an inner of the opening of the U shape.

Optionally, the reinforcing member may further include a first hook and a second hook protruding from the front walls along a second vertical direction opposite to the first vertical direction, and a third hook protruding from a bottom of the U shape along the second vertical direction. The a first recess, a second recess and a third recess may be provided in the tower. The first hook, the second hook and the third hook may be mated to the first recess, the second recess and the third recess, correspondingly.

These techniques may be used alone or in any suitable combination. The foregoing summary is provided by way of illustration and is not intended to be limiting.

BRIEF DESCRIPTION OF DRAWINGS

The accompanying drawings may not be drawn to scale. In the drawings, each identical or nearly identical component that is illustrated in various figures may be represented by a like numeral. For purposes of clarity, not every component may be labeled in every drawing. In the drawings.

Figure 1:
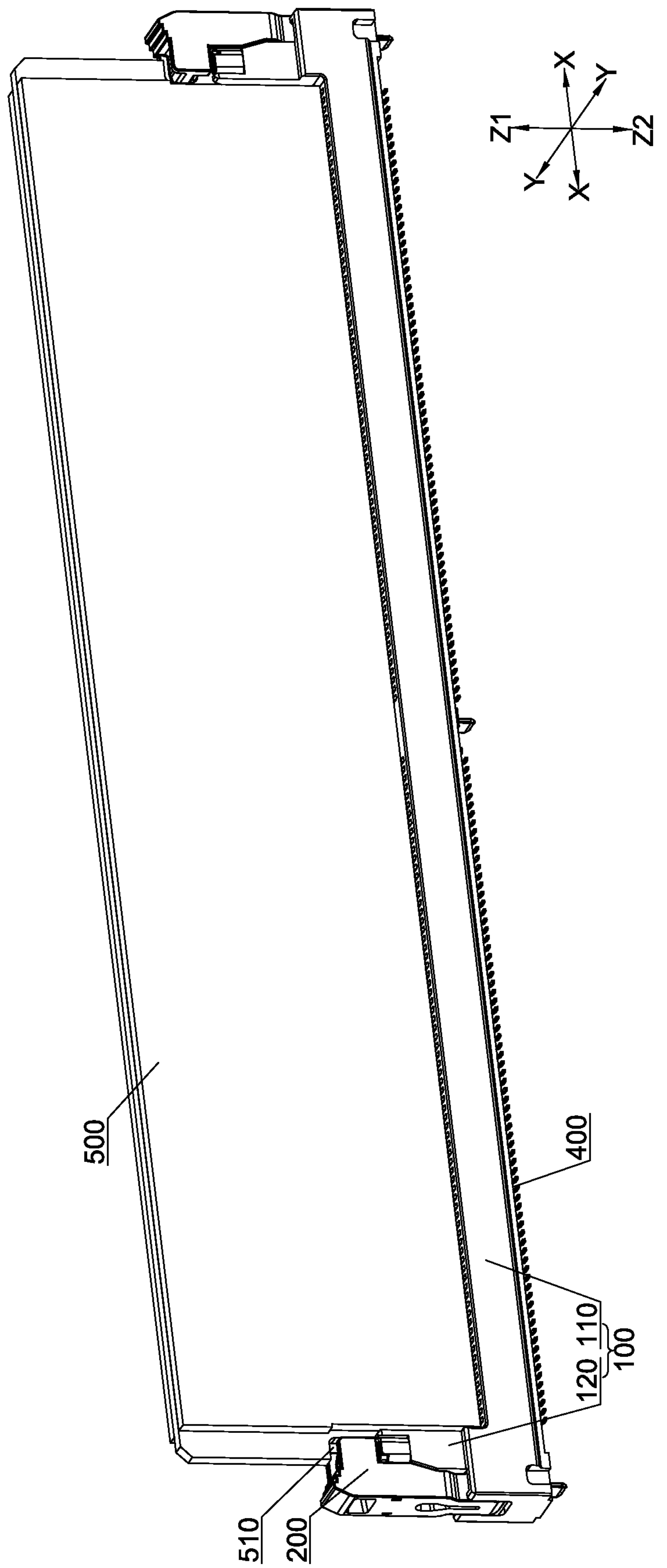
FIG. 1 is a perspective view of a card edge connector according to an exemplary embodiment of the present disclosure connected with an electronic card, wherein latches are at locked positions.

The above accompanying drawings include the following reference signs:

100, insulating housing; 101, mating surface; 102, mounting surface; 110, body; 120, tower; 130, extension; 140, groove; 141, first groove sidewall; 142, second groove sidewall; 143, groove bottom wall; 150, tower body; 151, upper portion of tower body; 151*a*, first pillar; 151*b*, second pillar; 151*c*, end wall; 151*d*, gap; 151*e*, third pillar; 151*f*, fourth pillar; 152, lower portion of tower body; 160, protrusion; 170, reinforcing wall; 171, abutting surface; 180, guiding slope; 181, slot; 183, recessed portion; 190, mounting groove; 191, first recess; 192, second recess; 193, third recess; 194, first step; 195, second step; 200, 200', latch; 210, limit recess; 220, latch body; 221, heat dissipation hole; 222, slanted surface; 223, latch head; 224, side wing; 230, 230', beam; 241, first gap; 242, second gap; 250, bulge; 251, first bulge sidewall; 252, second bulge sidewall; 253, first surface; 254, second surface; 261, operating portion; 262, pivot portion; 263, transverse rib; 270, molded opening; 300, reinforcing member; 301, opening; 310, reinforcing body; 320*a*, 320*b*, front wall; 321, chamfer; 330, elastic portion; 341, first side wall; 342, second side wall; 361, first hook; 362, second hook; 363, third hook; 400, conductor; 500, electronic card; 510, notch.

DETAILED DESCRIPTION

The inventors have recognized and appreciated connector designs that have latches narrower than 4.2 mm, yet operate reliably, contributing to reliable performance of systems using those electrical connectors. A card edge connector may be used in an electronic system for interconnection between circuit boards (e.g., graphics cards, memory cards). As an example, DDR5 (Double-Data-Rate at generation 5) is a memory specification used in computers. Electronic cards according to the DDR5 specification can be interconnected with a computer mainboard through card edge connectors. A card edge connector may be fixed onto the mainboard, and conductors in the card edge connector are interconnected with circuits in the mainboard. An electronic card can be electrically connected to the card edge connector so that golden fingers in the electronic card are electrically connected with the conductors in the card edge connector, thereby achieving the interconnection of the golden fingers of the electronic card with the circuits in the mainboard. In order to secure the electronic card in the card edge connector, the card edge connector may further comprise a latch which can be pivotably connected to an insulating housing of the card edge connector. After the electronic card is inserted into the insulating housing in place, the latch may be rotated to a locked position to secure the electronic card in the card edge connector.

Conventionally, an electronic card may have notches on, for example, opposite sides of the card, corresponding to the latches on opposite sides of a card edge connector. When the electronic card is inserted into the slot of the connector and the latches are pivoted to the locked position, the latches may hold edges of the notches so as to secure the electronic card. However, the electronic card may shake relative to the card edge connector as a result of vibration or other operating conditions of the system, which may weaken or otherwise disrupt connections between the electronic card and the card edge connector.

The inventors have also recognized and appreciated techniques to reduce the shaking. The inventors theorize that, while the bottom of the electronic card is inserted into a slot of the insulating housing and therefore relatively secured in the slot, gaps may exist between the latches and the insulating housing. Such gaps provide spaces for the latches to move in the insulating housing as a result of vibration or other operating conditions of the system. Since the latches hold the notches of the electronic card, the electronic card may move with the latches.

The inventors also have recognized and appreciated that recent system developments pose further challenges to the reliability of card edge connectors. For example, Joint Electron Device Engineering Council (JEDEC) provides a card edge connector with a narrower latch, which should have a width no greater than 4.2 mm in a transverse direction. A width of a tower of the insulating housing in a transverse direction may also be reduced to accommodate the narrower latch.

The inventors have recognized and appreciated connector designs that can provide reliable performances, while satisfying system requirements (e.g., smaller dimensions) set by industry standards. In some embodiments, the tower may have an extension protruding toward the latch. The latch may have a recess configured to receive the extension of the tower. Such a configuration enables securing the latch to the upper portion of the tower, without increasing a transverse dimension of the tower and/or latch. Optionally, a reinforcing member may be inserted between the tower body and the extension of the tower. The reinforcing member may be made of a material, such as metal, with higher strength than the material for the insulating housing. Such reinforcing member may be manufactured separately from the insulating housing, and then is mounted into a mounting groove of the tower. The reinforcing member may enable reliable narrower towers and/or latches.

A vertical direction Z-Z, a longitudinal direction X-X, and a transverse direction Y-Y described herein may be perpendicular to one another. The vertical direction Z-Z may refer to a height direction of the electrical connector. The vertical direction Z-Z may include a first vertical direction Z-Z and a second vertical direction Z-Z which are opposed to each other. The longitudinal direction X-X may refer to a length direction of the electrical connector. The transverse direction Y-Y may refer to a width direction of the electrical connector.

Figure 2:
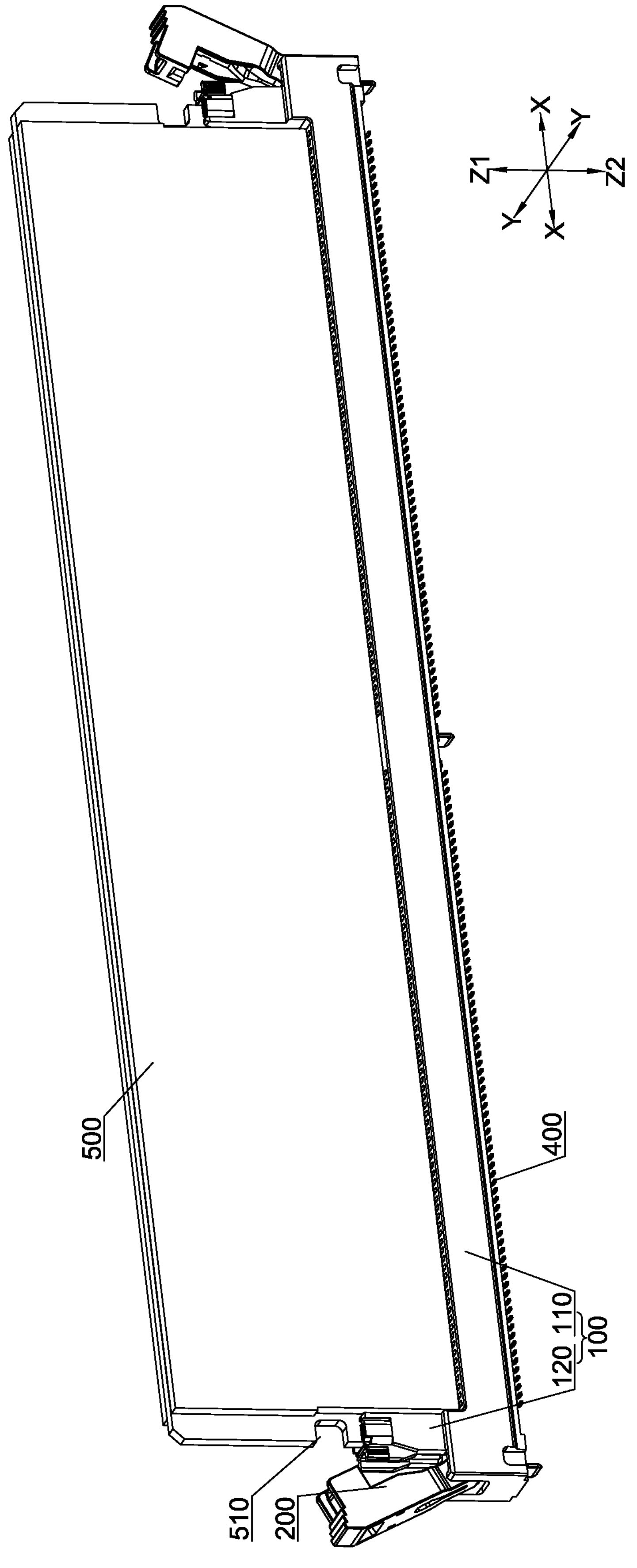
FIG. 2 is a perspective view of the card edge connector connected with the electronic card as shown in FIG. 1, wherein the latches are at unlocked positions.
Figure 3:
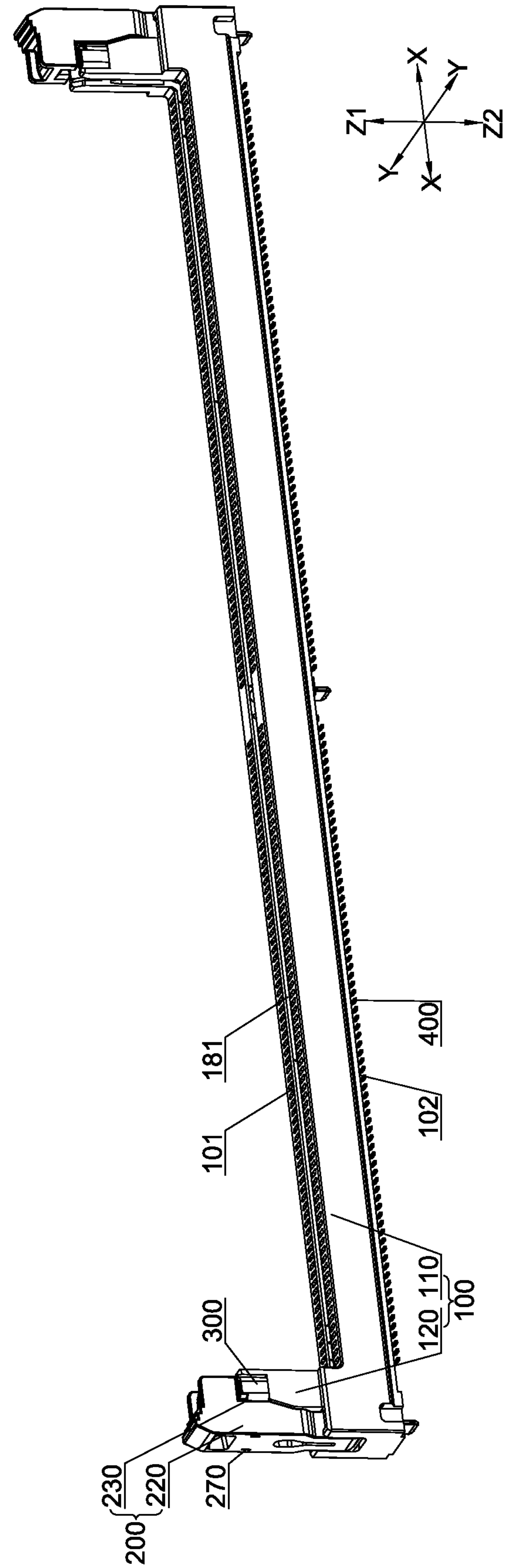
FIG. 3 is a perspective view of a card edge connector according to an exemplary embodiment of the present disclosure.

As shown in FIGS. 1-3, a card edge connector may include an insulating housing 100 and a latch 200. The insulating housing 100 may be molded of an insulating material, such as plastic. The insulating housing 100 may be an integrated piece. The insulating housing 100 may have a mating surface 101 and a mounting surface 102. The mating surface 101 and the mounting surface 102 may be opposite to each other along the vertical direction.

A plurality of conductors 400 may be provided in the insulating housing 100. The adjacent conductors 400 may be arranged spaced apart to ensure that the adjacent conductors 400 are electrically insulated from each other. The conductors 400 may be made of a conductive material, such as metal. Each of the conductors 400 may be an elongated integrated piece. Each conductor 400 along its extension direction may include a mating contact portion and a mounting tail disposed at both ends of the conductor 400. The mating contact portion may be used to electrically connect with circuits in an electronic card 500. The electronic card 500 includes but not limited to a memory card and a graphics card, etc. The mounting tail may be connected with a pad on the mainboard by soldering. In this way, the electronic card 500 is electrically connected with the mainboard via the card edge connector, thereby achieving the interconnection between the circuits in the electronic card 500 and those in the mainboard. A slot 181 may also be provided in the insulating housing 100. The bottom of the electronic card 500 may be inserted into the slot 181. The mating contact portion of the conductor 400 may extend to the mating surface 101, for example, into the slot 181 in the mating surface 101. The mounting tail of the conductor 400 may extend outside the mounting surface 102. The conductors 400 may be arranged in two rows on opposite sides of the slot 181, with each row extending along the longitudinal direction X-X. Optionally, the two rows of conductors 400 may be aligned with each other along the longitudinal direction X-X. Optionally, the two rows of conductors 400 may be staggered along the longitudinal direction X-X to increase the distance between the conductors 400 to reduce crosstalk.

The insulating housing 100 may include a body 110 and a tower 120. The body 110 may extend along the longitudinal direction X-X. The tower 120 may be connected to an end of the body 110 in the longitudinal direction X-X. The tower 120 may protrude out of the body 110 from the end of the body 110 along the first vertical direction Z1. The orientation terms used herein are all relative to the placement of the card edge connector as shown in FIGS. 1-3, that is, under the said placement, the first vertical direction Z1 can be an upward direction, and the second vertical direction Z2 can be a downward direction.

The body 110 have two ends opposed to each other in the longitudinal direction X-X. Exemplarily, there may be one tower 120 at an end of the body 110. there is a tower 120 at each end of the body 110. The tower 120 may serve as an longitudinal end of the insulating housing 100.

The latch 200 may be molded with an insulating material, such as plastic by molding. The latch 200 may be an integrated piece. The materials for molding the latch 200 and the insulating housing 100 may be the same or different. The latch 200 may be pivotably connected to the body 110 between the locked position and the unlocked position.

Figure 7:
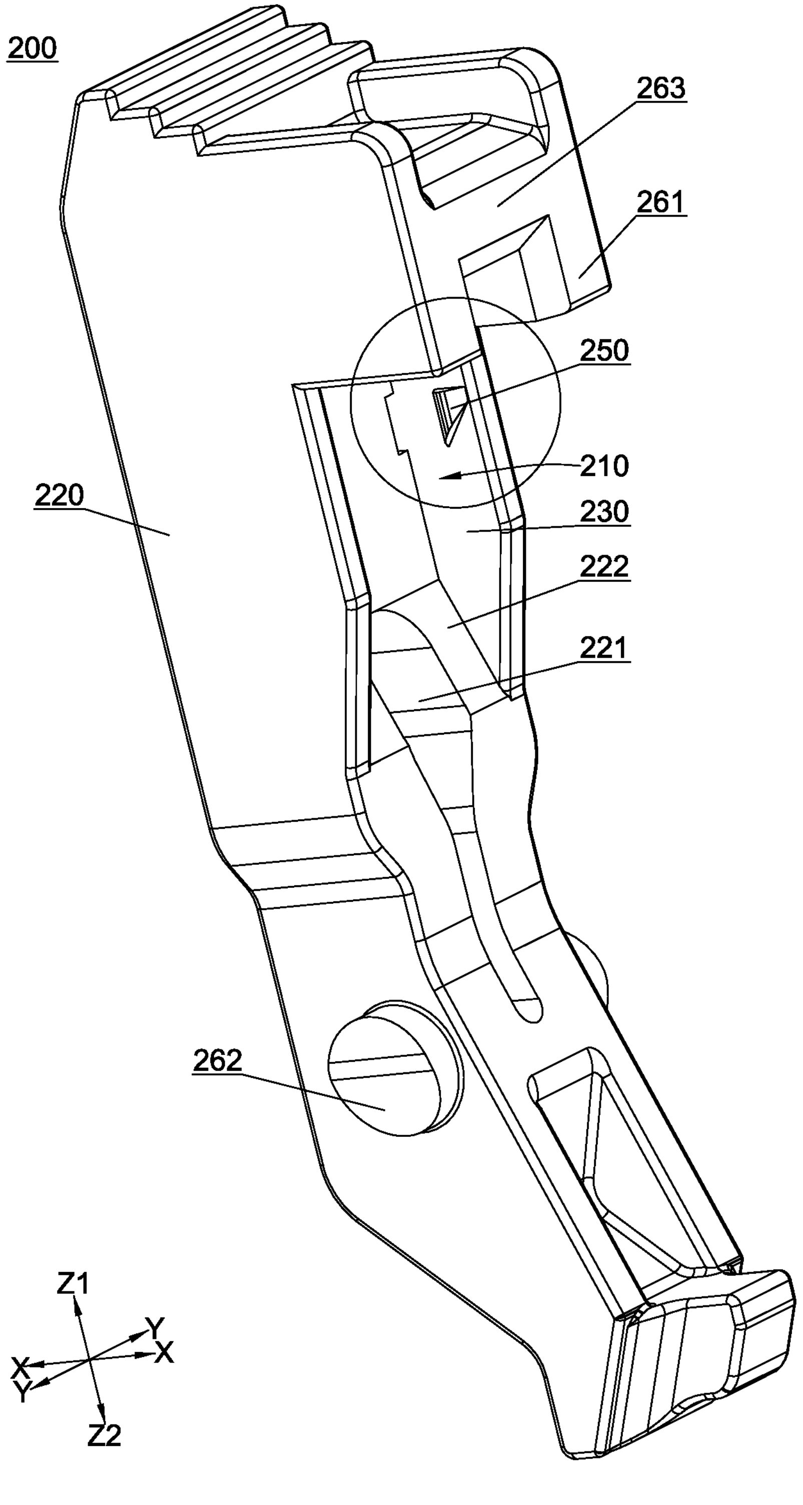
FIG. 7 is a perspective view of the latch of the card edge connector as shown in FIG. 3.

As shown in FIG. 7, the latch 200 is generally provided with a heat dissipation hole 221 which may be aligned with the slot 181 along the longitudinal direction X-X. More heat is generated by an electronic system operating under higher data rates. However, the circuits in the circuit board are getting denser, and the gap between the adjacent electrical connectors is small or virtually unset, which is not conducive to heat dissipation. In particular, where a plurality of card edge connectors are typically arranged side by side along a transverse direction Y-Y and close to one another on the mainboard, heat dissipation mainly depends on the ventilation along the longitudinal direction X-X. In this case, a larger heat dissipation hole is expected, but it is bound to reduce the mechanical strength of the latch 200. Thus, the width of the upper portion of the latch 200 may be larger. The lower portion of the latch 200 may be solid, and a projecting pivot portion 262 is disposed on the lower portion of the latch 200. The pivot portion 262 may be adaptive to a recessed portion 183 provided on the body 110 to achieve pivot connection.

The latch 200 may be used to retain and release the electronic card 500 connected to the insulating housing 100. For example, when the latch 200 in FIG. 1 is in the locked position, a transverse rib 263 at the upper portion of the latch 200 (as shown in FIG. 7) may be inserted into a notch 510 of the electronic card 500 and the edge of the notches 510 may be locked by the latch 200, such that the electronic card 500 can be retained in the slot 181 of the insulating housing 100 by the latch 200. When the latch 200 is in the unlocked position as shown in FIG. 2, the latch 200 is pivoted outward and the transverse rib 263 exits from the notch 510, such that the electronic card 500 can be removed from the insulating housing 100 or the electronic card 500 can be connected to the insulating housing 100.

As shown in FIGS. 4-8, an extension 130 may be provided on the tower 120. A limit recess 210 may be provided in the upper portion of the latch 200. When the latch 200 is in the locked position, the extension 130 may engage with the limit recess 210. For example, the extension 130 may be inserted into the limit recess 210 to engage with the limit recess 210. In this way, the latch 200 may be positioned by the tower 120, so that the stability of the latch 200 can be ensured. Optionally, the extension 130 may be disposed on the latch 200 and the limit recess 210 may be disposed in the tower 120. Other structures may be used to lock the latch 200 and the tower 120. In this way, the latch 200 is less prone to sway, such that the electronic card 500 held by the insulating housing 100 is more stable and the mechanical and electrical properties of the card edge connector are improved.

Optionally, to facilitate the operation to the latch 200, an operating portion 261 may be provided at the upper end of the latch 200. The operating portion 261 may include one or more of anti-skidding stripes, recesses and steps. The operating portion 261 helps users to pivot the latch 200 between the locked position and the unlocked position.

For a card edge connector with a narrower latch, the transverse dimension of the tower 120 may be smaller than that of the body 110. Taking the electronic card under DDR specifications as an example, the transverse dimension of the body 110 may be 6.5 mm. Thus, the transverse dimensions of the tower 120 and the latch 200 may be less than 6 mm. Further, the transverse dimensions of the tower 120 and the latch 200 may be less than 5.5 mm. Further, the transverse dimensions of the tower 120 and the latch 200 may be less than mm. Further, the transverse dimensions of the tower 120 and the latch 200 may be less than 4.5 mm. Even further, the transverse dimensions of the tower 120 and the latch 200 may be less than 4.2 mm. In the embodiment shown in the drawings, further, the transverse dimensions of the tower 120 and the latch 200 may be 4.1 mm.

When a plurality of electronic cards 500 are needed to be connected to the mainboard, a plurality of card edge connectors may be provided, each being connected with one electronic card 500. These card edge connectors may be arranged side-by-side on the mainboard along a transverse direction Y-Y.

Taking the above embodiment as an example, when the electronic system using the card edge connector operates, the electronic card 500 and the mainboard generate heat. Since the transverse dimensions of the tower 120 and the latch 200 both are smaller than that of the body 110, even if these card edge connectors are arranged close to each other along the transverse direction Y-Y, there are still gaps between the towers 120 and the latches 200 of the adjacent card edge connectors above the body 110. Air can flow between the electronic cards 500 through the gaps, thereby taking away the heat from the electronic cards 500 and the mainboard to ensure that the electronic cards 500 are not overheating. In this way, the electronic cards 500 cannot be damaged, and the electronic system can operate properly.

For the airflow, the center distance of the adjacent card edge connectors along the transverse direction Y-Y may be at least 25% larger than the transverse dimensions of the tower 120 and the latch 200. Further, the center distance of the adjacent card edge connectors may be at least 30% larger than the transverse dimensions of the tower 120 and the latch 200. Further, the center distance of the adjacent card edge connectors may be at least 35% greater than the transverse dimensions of the tower 120 and the latch 200.

Understandably, even if there is only one card edge connector in the electronic system, since the transverse dimension of at least the portion of the latch 200 disposed above the body 110 is smaller than that of the body 110, the air can flow around the electronic card 500 smoothly. Accordingly, it is also better for the heat dissipation of the electronic card 500. The card edge connector may be more suitable in the scenarios where the ventilation is poor, the card edge connector works for a long time, and the electronic system generates a lot of heat.

A latch may have features that may provide more flexibility and therefore enable a reduced force for operating the latch. Optionally, the latch 200 may include a latch body 220 and a pair of beams 230. The pair of beams 230 may protrude from the latch body 220 along the longitudinal direction X-X. The latch body 220 is pivotally connected to the body 110 between the locked position and unlocked position. The pair of beams 230 may be spaced apart along the transverse direction Y-Y. The limit recess 210 can be enclosed and formed by the latch body 220 and the pair of beams 230. With such an arrangement, the limit recess 210 can be configured simply and manufactured cost-savingly, without increasing the transverse dimension of the latch 200.

Figure 10:
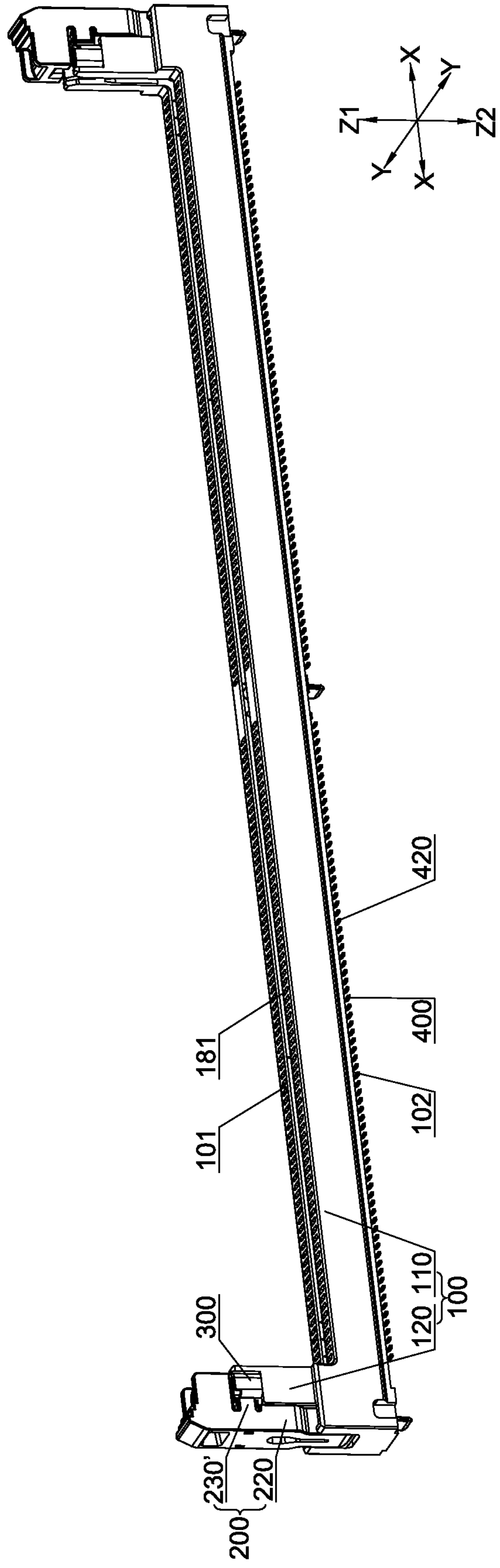
FIG. 10 is a perspective view of a card edge connector according to another exemplary embodiment of the present disclosure.
Figure 11:
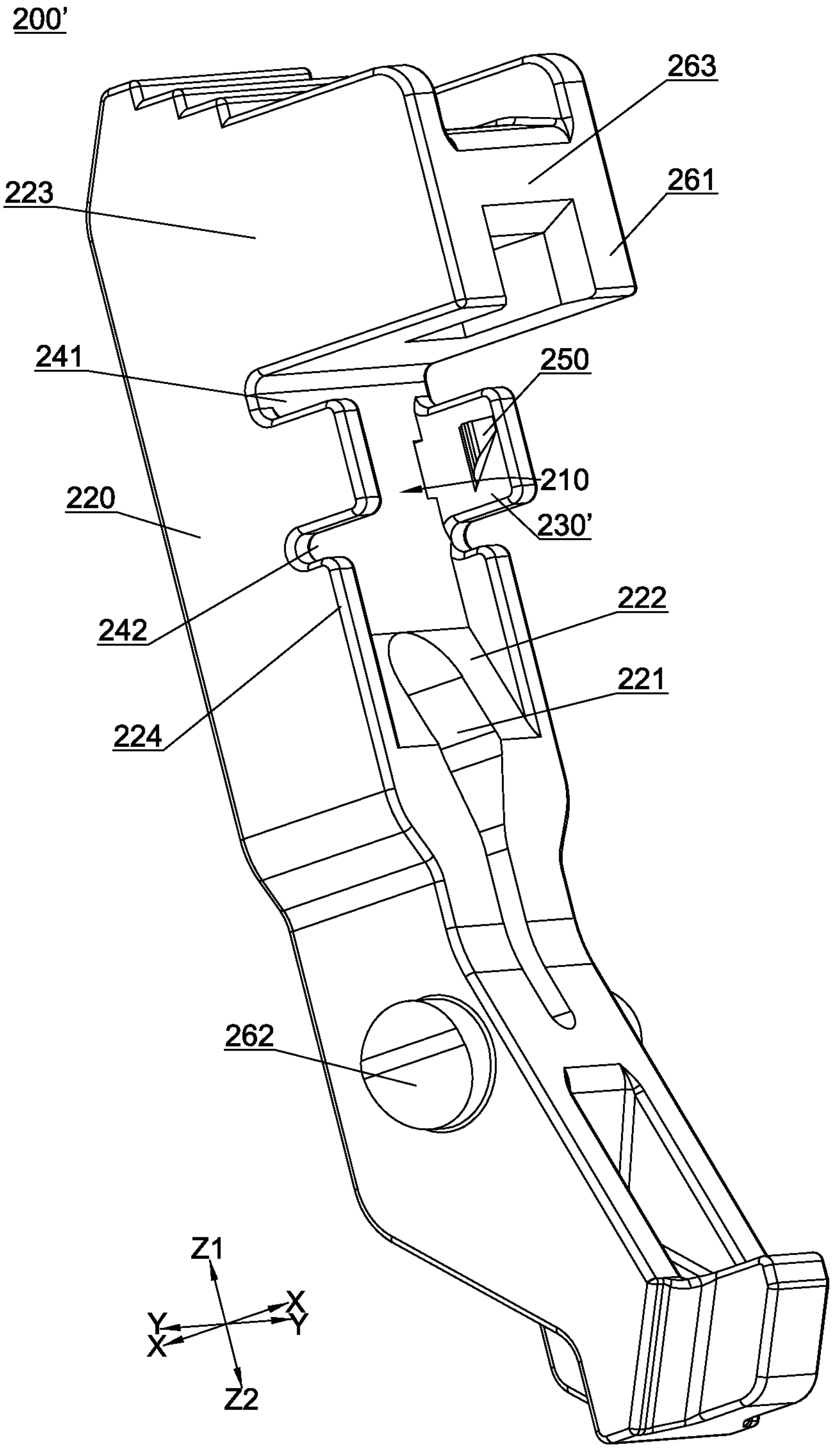
FIG. 11 is a perspective view of a latch of the card edge connector as shown in FIG. 10.

In an embodiment as shown in FIGS. 10-11, a pair of beams 230' may be spaced apart from the latch body 220 on opposite sides in the vertical direction. Referring to FIG. 11, the beams 230' are spaced apart from a latch head 223 of the latch body 220 along the first vertical direction Z1 to form first gaps 241. The transverse rib 263 is provided on the latch head 223. The beams 230' are spaced apart from side wings 224 on the latch body 220 along the second vertical direction Z2 to form second gaps 242. The side wings 224 on the latch body 220 may be optional. In such an arrangement, the beams 230' may have better elasticity. In this way, when the extension 130 engages with and disengages from the limit recess 210, it is more labor-saving.

In order to illustrate the principle of the card edge connector, the components in the embodiment as shown in FIGS. 10-11 which are the same as or similar to those of the aforesaid embodiments are indicated with the same reference signs. And for the sake of concision, these same or similar components are not described in more details herein.

Exemplarily, referring back to FIGS. 5-6, the tower 120 may include a tower body 150 and the extension 130 that may include a pair of protrusions 160. The extension 130 may extend from the tower body 150 along the longitudinal direction X-X toward the latch 200. The pair of protrusions 160 may be spaced apart along the transverse direction Y-Y. The outer sides of the pair of protrusions 160 may engage with the limit recess 210. In such an arrangement, the extension 130 can be configured simply and manufactured cost-savingly, without increasing the transverse dimension of the tower 120. In other embodiments, the extension may be an integrated piece rather than two separate portions formed by the pair of protrusions 160.

Exemplarily, as shown in FIGS. 4-8, the extension 130 may further include a pair of reinforcing walls 170. The pair of reinforcing walls 170 may be disposed in one-to-one correspondence with the pair of protrusions 160. Each of the reinforcing walls 170 and its corresponding protrusion 160 are successively disposed along the first vertical direction Z1. The pair of the reinforcing walls 170 may extend from the corresponding protrusions 160 along the second vertical direction Z2, and be connected to the tower body 150. Exemplarily, a groove 140 (to be described in detail below) may not extend in the pair of reinforcing walls 170. In this way, the reinforcing walls 170 can have better mechanical strength, and thereby providing better support for the pair of protrusions 160 and enabling the pair of protrusions 160 to be more secure.

Exemplarily, the pair of reinforcing walls 170 may have abutting surfaces 171 facing the latch 200. The abutting surfaces 171 may incline toward the inner side of the insulating housing 100 along the second vertical direction Z2. A slanted surface 222 may be provided on the latch 200, as shown in FIG. 7. The slanted surface 222 can be adaptive to the abutting surfaces 171. The slanted surface 222 may be disposed in the inner of the limit recess 210. When the latch 200 is in the locked position, the abutting surfaces 171 may abut against the slanted surface 222. With such a configuration, there can be a better limiting effect to ensure that the latch 200 can be accurately pivoted to the locked position. The reinforcing walls 170 and the protrusions 160 may protrude along the longitudinal direction X-X toward the latch 200 beyond a lower portion 152 of the tower body, and accordingly, the reinforcing wall 170 may have sufficient mechanical strength and may extend into the latch 200 to abut against the slanted surface 222 in the limit recess 210. The reinforcing walls 170 protruding beyond the lower portion 152 of the tower body may allow sufficient space on the reinforcing wall 170 to configure the grooves 140.

Exemplarily, the grooves 140 may be provided on opposite sides of the extension 130 along the vertical direction Y-Y. In an embodiment where the tower 120 includes the pair of protrusions 160, the grooves 140 may be disposed adjacent to respective ones of the pair of protrusions 160 that are opposite to each other along the transverse direction Y-Y. Bulges 250 may be provided on a pair of inner side surfaces of the limit recess 210, respectively. In the embodiment where the latch 200 includes the pair of beams 230, the bulges 250 may be provided on the inner side surfaces facing each other along the transverse direction Y-Y of the pair of beams 230. When the latch 200 is in the locked position, the grooves 140 may engage with the corresponding bulges 250, respectively. For example, when the latch 200 is pivoted to the locked position, the bulges 250 may snap into the corresponding grooves 140, thus completing the engagement. With such a configuration, the latch 200 can be prevented from being accidentally opened due to the vibration or other reasons, which may result in losing the locking effect for the electronic card 500. Moreover, when the bulges 250 are inserted into the corresponding grooves 140, a "click" sound and vibration can be generated, and the user can clearly perceive the sound and vibration, thereby confirming that the latch 200 is pivoted to the locked position. In addition, the grooves 140 may cooperate with the abutting surfaces 171 on the reinforcing wall 170 to exert substantially opposite forces upon the latch 200. For example, the abutting surfaces 171 may exert outward a pushing force upon the slanted surface 222 of the latch 200 along the longitudinal direction X-X, and the grooves 140 may exert a pulling force upon the bulge 250 of the latch 200 in the opposite direction of the pushing force, thereby maintaining the stability of the latch 200 along the longitudinal direction X-X.

Figure 4:
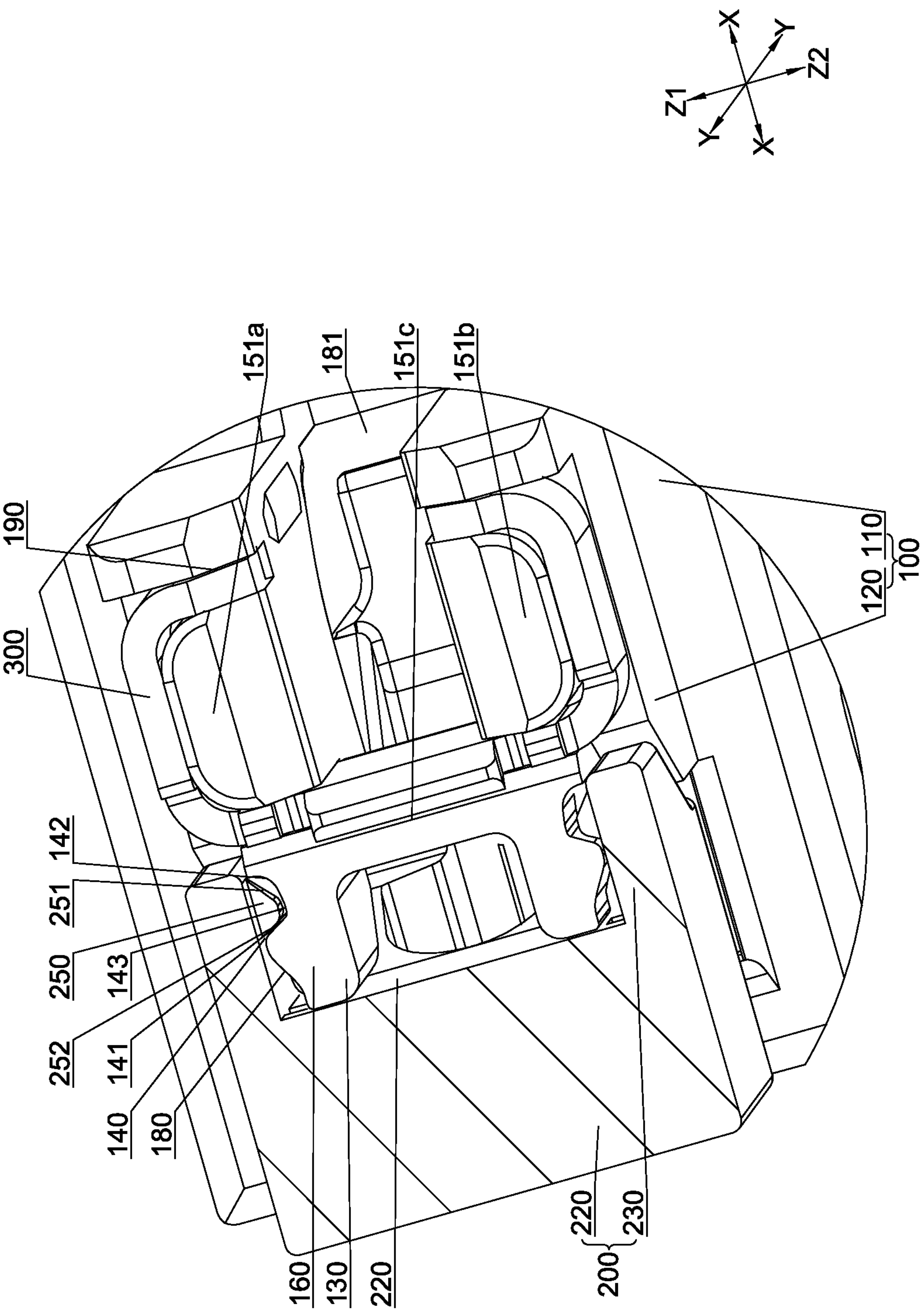
FIG. 4 is a partial sectional view of the card edge connector as shown in FIG. 3 taken by a plane perpendicular to a vertical direction.
Figure 5:
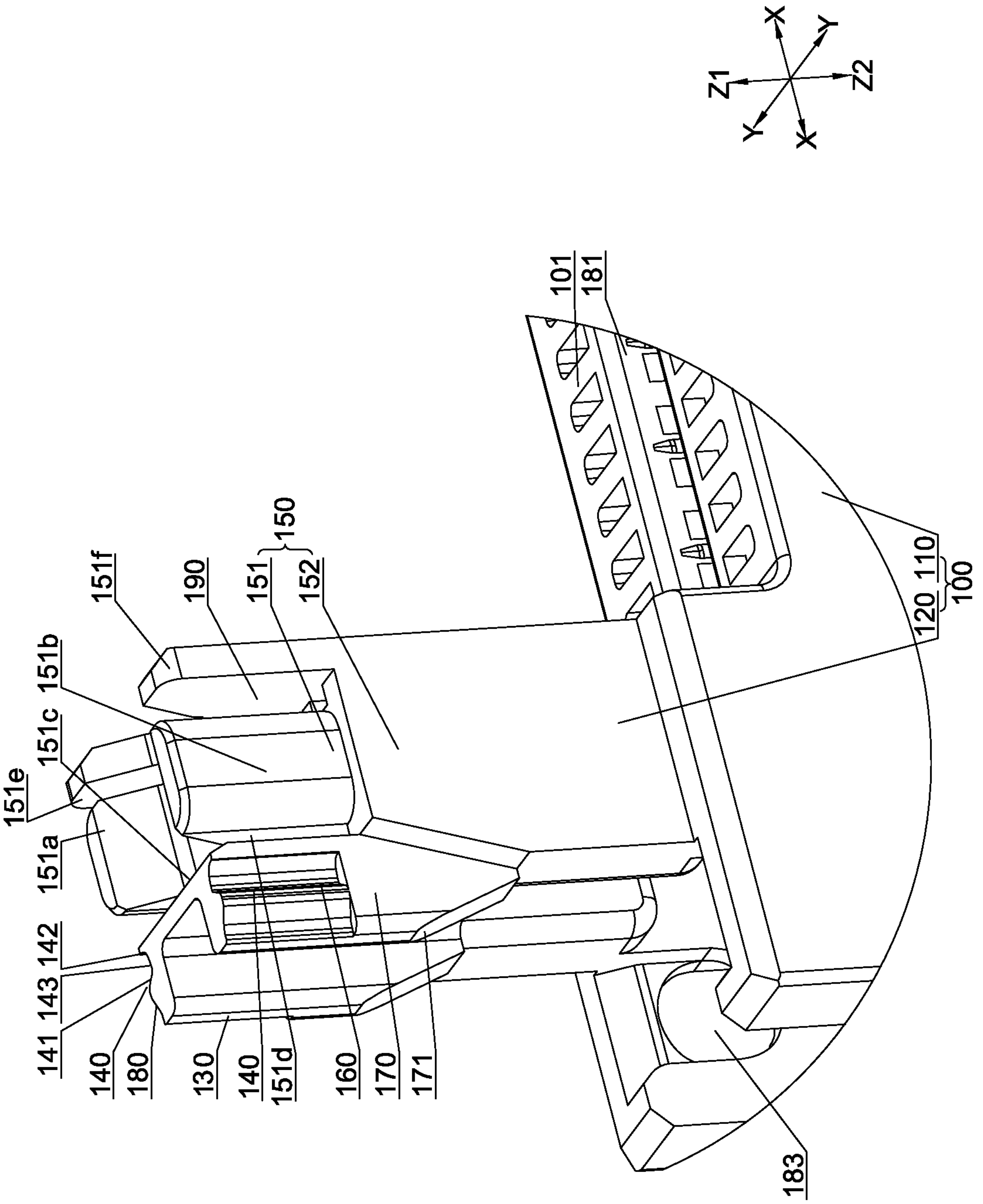
FIG. 5 is a partial perspective view of an insulating housing of the card edge connector as shown in FIG. 3 in an angle.
Figure 6:
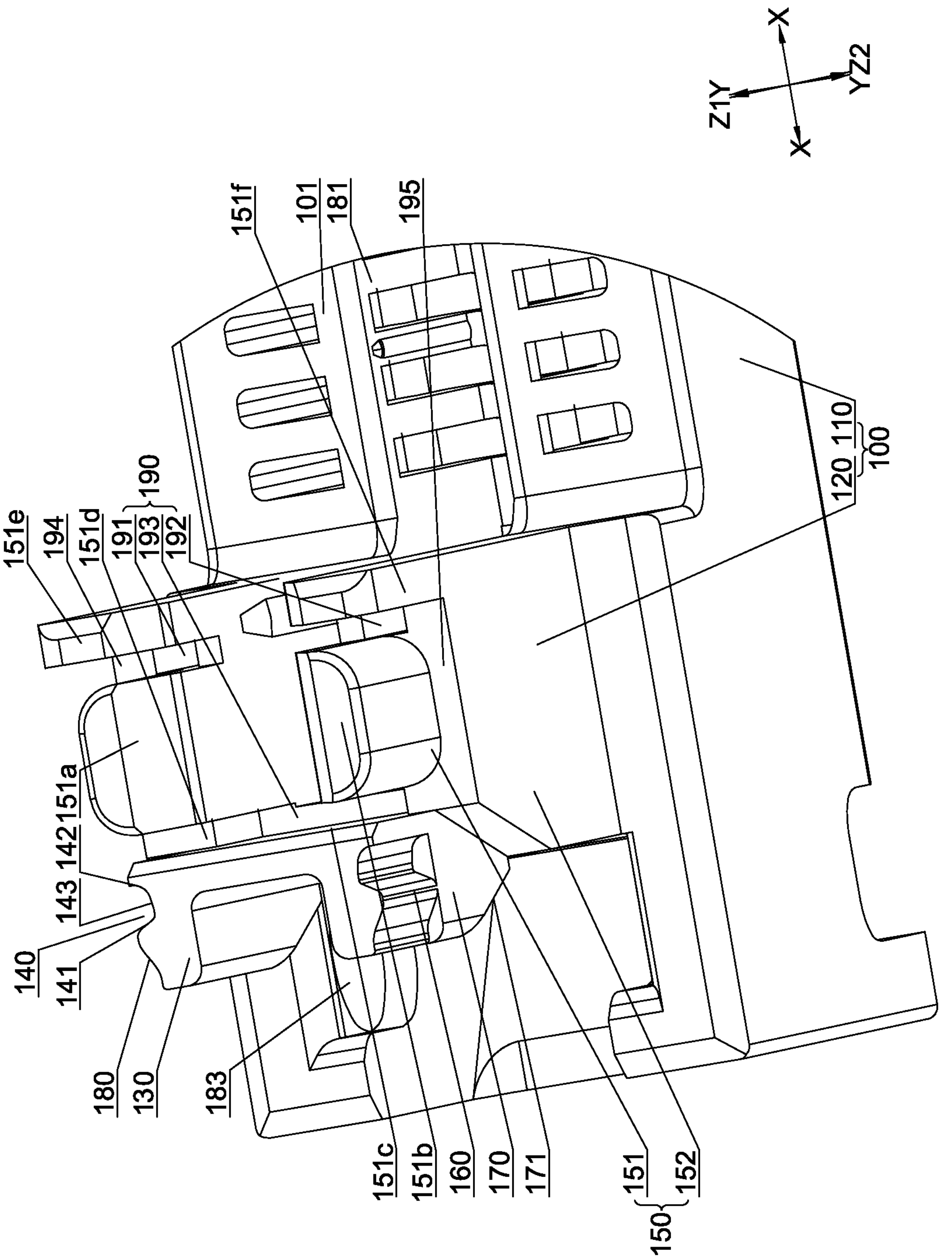
FIG. 6 is a partial perspective view of the insulating housing of the card edge connector as shown in FIG. 3 in another angle.

Exemplarily, each of the grooves 140 may have a first groove sidewall 141, a second groove sidewall 142, and a groove bottom wall 143, as shown in FIGS. 4-6. The groove bottom wall 143 may be connected between the first groove sidewall 141 and the second groove sidewall 142. The first groove sidewall 141 and the second groove sidewall 142 extend from two side of the groove bottom wall 143 to an opening of the groove 140 respectively, and the first groove sidewall 141, the second groove sidewall 142 and the groove bottom wall 143 enclose to form the groove 140. For example, the first groove sidewall 141 and the second groove sidewall 142 may extend along the vertical direction. The first groove sidewall 141 along the longitudinal direction X-X is closer to the outer side of the insulating housing 100 relative to the second groove sidewall 142. Thus, when the latch 200 is pivoted to the locked position, the bulge 250 can slide into the corresponding groove 140 over the first groove sidewall 141. An angle between the first groove sidewall 141 and the transverse direction Y-Y can be greater than that between the second groove sidewall 142 and the transverse direction Y-Y. In this way, the first groove sidewall 141 is gentler as compared to the second groove sidewall 142. Thus, in the process of locking and unlocking, the bulge 250 can successfully snap into and disengage from the grooves 140 over the first groove sidewall 141. The second groove sidewall 142 is steeper which can provide a better limiting effect, thereby preventing the latch 200 from being pivoted further toward the insulating housing 100 after it is reach to the locked position.

Exemplarily, a guiding slope 180 may be provided on opposite sides of the extension 130. The guiding slopes 180 along the longitudinal direction X-X are closer to the outer side of the insulating housing 100 relative to the grooves 140. The pair of guiding slopes 180 approach each other in a direction away from the grooves 140. The guiding slopes 180 include but not limited to, flat or curved surfaces, etc. When the latch 200 is pivoted toward the locked position, the bulges 250 may slide over the corresponding guiding slopes 180. The guiding slopes 180 may play a better guiding role in smooth engagement of the extension 130 with the limit recess 210.

Exemplarily, as shown in FIG. 5, the grooves 140 may pass through the extension 130 along the first vertical direction Z1. Along the second vertical direction Z2, the grooves 140 may or may not pass through the extension 130. As described above, reinforcing walls 170 may be connected to the bottom of the extension 130. In order to ensure the mechanical strength of the reinforcing wall 170 and the structural compactness of the tower, the extension 130 and the reinforcing walls 170 may have substantially the same dimension along the transverse direction Y-Y. The grooves 140 are concave inward from the side surfaces of the extension 130. In this case, the grooves 140 passing through the extension 130 along the first vertical direction Z1 also enables the grooves 140 to be easily processed by molding or other methods, allowing the insulating housing 100 to be processed integrally.

Exemplarily, as shown in FIG. 4, each of the bulges 250 may have a first bulge sidewall 251 and a second bulge sidewall 252. The first bulge sidewall 251 is closer to the inner side of the insulating housing 100 along the longitudinal direction X-X relative to the second bulge sidewall 252. In the process of the latch 200 being pivoted to the unlocked position, the second bulge sidewall 252 may slide over the first groove sidewall 141 of the corresponding groove 140, thereby disengaging the bulge 250 from the groove 140. A sharp angle between the first bulge sidewall 251 and the transverse direction Y-Y may be greater than that between the second bulge sidewall 252 and the transverse direction Y-Y. In this way, the second bulge sidewall 252 is steeper than the first bulge sidewall 251. The second bulge sidewall 252 and the first groove sidewall 141 cooperate to provide a better limiting effect, thereby preventing the latch 200 from being pivoted to get out of the locked position. In the process of locking of the latch 200, the gentler first bulge sidewall 251 slides smoothly over the corresponding guiding slope 180. Exemplarily, the first bulge sidewall 251 may have almost the same slope as the guiding slope 180. Further, the first bulge sidewall 251 may have an equivalent slope to the guiding slope 180. With such a configuration, in the process of the gentler first bulge sidewall 251 sliding over the guiding slope 180, the contact surface of the both is larger all the time, thereby further improving the smoothness of the sliding.

Figure 8:
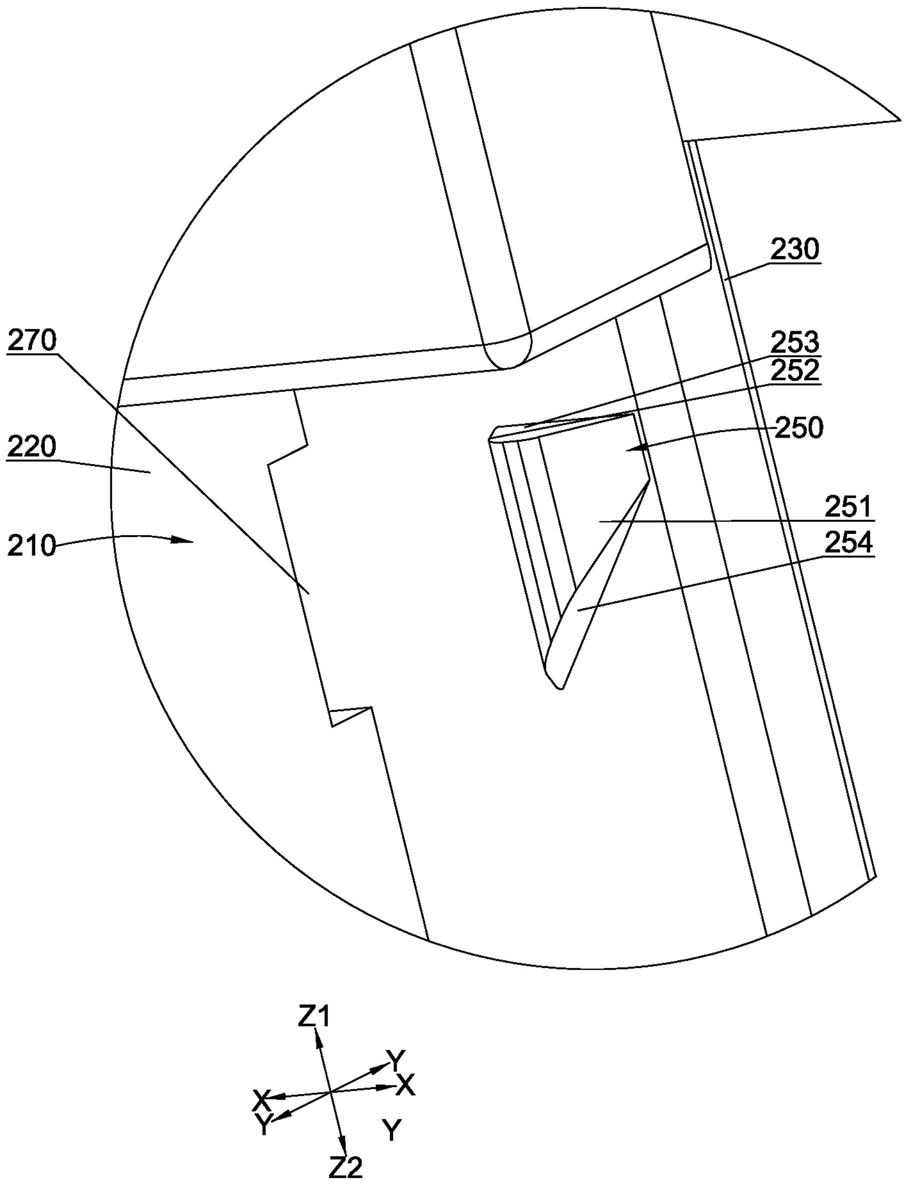
FIG. 8 is a partial enlarged view of the latch of the card edge connector as shown in FIG. 7.

Exemplarily, the vertical dimension of the bulge 250 may gradually decrease along the longitudinal direction X-X toward the inner side of the insulating housing 100, as shown in FIG. 8. In this way, in the process of the latch 200 being pivoted to the locked position, the contact area between the bulge 250 and the corresponding groove 140 gradually increases. In this way, the friction force in the locking process can be reduced, and less force is applied to the latch 200 pivoted to the locked position by an user. Moreover, when the latch 200 is pivoted toward the unlocked position, the contact area between the bulge 250 and the corresponding groove 140 is larger, resulting in a higher friction force between the bulge 250 and the corresponding groove 140. In this way, the bulge 250 can play a better limiting role, thereby preventing the incorrect operation which may cause the bulge 250 to disengage from the grooves 140.

Exemplarily, the bulge 250 may have a first surface 253 and a second surface 254. The first surface 253 may extend along the longitudinal direction X-X. The second surface 254 may be inclined along the direction toward the inner side of the insulating housing 100, toward the first surface 253. With such a configuration, the vertical dimension of the bulge 250 can gradually decrease along the longitudinal direction X-X toward the inner side of the insulating housing 100. A molded opening 270 may be provided in the latch 200, as shown in FIG. 3 and FIG. 8. The molded opening 270 may be used to form the bulge 250 when the insulating housing 100 is integrally formed by molding. The first surface 253 and the second surface 254 may have the above-described structure to facilitate the mold processing of the latch 200 and reduce the manufacturing costs.

Exemplarily, as shown in FIGS. 3-4, the card edge connector may further include a reinforcing member 300. The reinforcing member 300 may be disposed in the tower 120. Optionally, there may be a reinforcing member 300 disposed in only one tower 120; or there may be a reinforcing member 300 in each of the two towers 120. The reinforcing member 300 may be made of a material with greater strength such as plastic, ceramic, metal, etc. The reinforcing member 300 may be made of a metallic material. The metallic material may have greater strength, and the material and the processing may be less expensive. The reinforcing member 300 may be an integrated sheet metal piece. In this way, the reinforcing member 300 may have higher strength, simple processing technique and low cost.

By disposing the reinforcing member 300 within the tower 120, the impact resistance of the tower 120 can be enhanced. In particular, in the card edge connector, the longitudinal dimension of the entire tower 120 is significantly greater than its transverse dimension. The tower 120 is prone to deformation or cracking, when suffering from an impact force along the transverse direction Y-Y. For the card edge connector with the transverse dimension of the tower 120 being less than that of the body 110, the mechanical strength of the tower 120 is poor, and thus the reinforcing member 300 is much more important.

Figure 9:
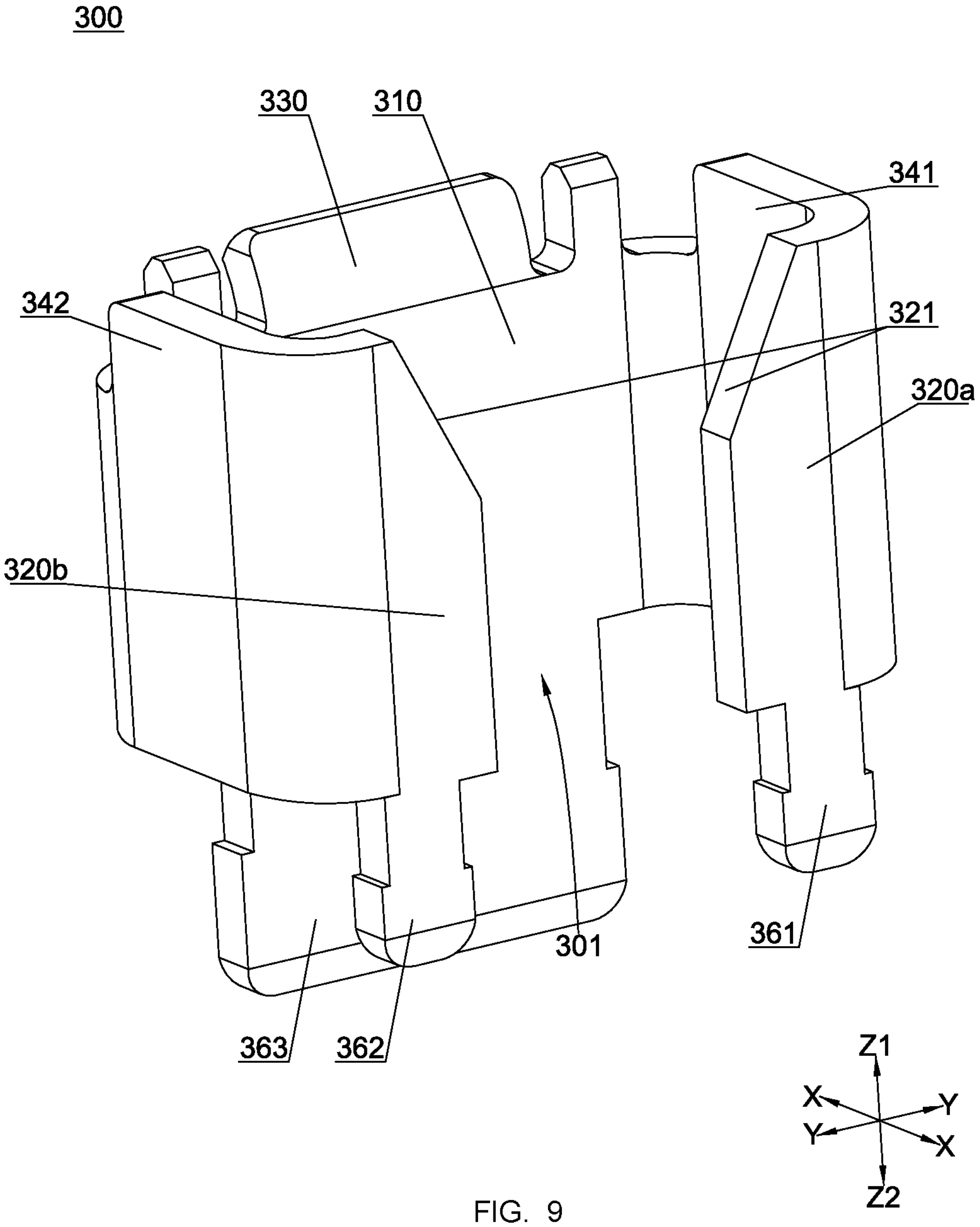
FIG. 9 is a perspective view of a reinforcing member of the card edge connector as shown in FIG. 3.

Exemplarily, the slot 181 may extend to the tower 120 from the body 110 along the longitudinal direction X-X. As shown in FIG. 9, the reinforcing member 300 may include a reinforcing body 310. The section of the reinforcing member 300 perpendicular to the vertical direction may be presented as a U shape. The section may be created by cutting the reinforcing member 300 using a plane perpendicular to the vertical direction. The end in the longitudinal direction X-X of the slot 181 may extend into an opening 301 of the U shape. The reinforcing member 300 may half surround the end of the slot 181. In the embodiment where the reinforcing member 300 is disposed in each of the two towers 120, the two reinforcing members 300 half surround the two ends in the longitudinal direction X-X of the slot 181, respectively. When the electronic card 500 is inserted into the slot 181, the reinforcing member 300 may maintain the shape of the tower 120 on both sides in the transverse direction Y-Y of the electronic card 500, preventing the tower 120 from deformation or cracking as the electronic card 500 is impacted by an external force. The reinforcing member 300 is simple in structure, and the mechanical strength of the slot 181 can be enhanced to prevent the slot 181 from deformation or cracking.

Exemplarily, as shown in FIGS. 5-6, the tower 120 may include a tower body 150. The extension 130 and the reinforcing member 300 may be successively disposed along the longitudinal direction X-X at the upper portion 151 of the tower body. That is to say, the extension 130 and the reinforcing member 300 may be disposed at almost the same height at the tower body 150. In this way, the latch 200 can be locked with the tower 120 at the upper portion of the tower 120, thereby improving the stability of the latch 200 and preventing the latch 200 from shaking relative to the insulating housing 100. Moreover, the reinforcing member 300 is close to the extension 130, so as to focus on improving the structural strengthen around the extension

130 to prevent this location from damage. The extension 130 is closer to the outer side of the insulating housing 100 along the longitudinal direction X-X relative to the reinforcing member 300. In this way, it is easy for the limit recess 210 on the latch 200 to engage with the extension 130.

Exemplarily, the extension 130 may be connected to the upper portion 151 and the lower portion 152 of the tower body, as shown in FIG. 5. Exemplarily, the extension 130 may be connected to both the upper portion 151 and the lower portion 152 of the tower body through the reinforcing wall 170. The lower portion 152 of the tower body may protrude toward the latch 200 beyond the upper portion 151 of the tower body. In this way, the engagement of the extension 130 and the limit recess 210 has a projection along the vertical direction which at least partially coincides with that of the lower portion 152 of the tower body. The said engagement refers to the part where the first groove sidewall 141 of the groove 140 in the extension 130 abuts against the second bulge sidewall 252 of the bulge 250 on the latch 200, as shown in FIG. 4. To achieve this, in the arrangement state as shown in the drawing, at least a part of the groove 140 in the extension 130 is disposed directly above the lower portion 152 of the tower body. At least a part of the first groove sidewall 141 of the groove 140 may be disposed directly above the lower portion 152 of the tower body. In this way, the lower portion 152 of the tower body can provide a good support effect to the extension 130, thereby improving the mechanical strength of this engagement.

In order to mount the reinforcing member 300, exemplarily, the upper portion 151 of the tower body may include a first pillar 151*a*, a second pillar 151*b* and an end wall 151*c*, as shown in FIGS. 5-6. The first pillar 151*a* and the second pillar 151*b* may be disposed at two side of the slot 181 opposed to each other in the transverse direction Y-Y. The end wall 151*c* may be spaced apart from the first pillar 151*a* and the second pillar 151*b* along the longitudinal direction X-X to form a gap 151*d*. The extension 130 may be provided on the end wall 151*c*. The extension 130 extends from the end wall 151*c* along the longitudinal direction X-X toward the outer side of the insulating housing 100. As described above, the section of the reinforcing body 310 perpendicular to the vertical direction presents a U shape. The bottom of the U shape may be inserted into the gap 151*d*. Both sides of the U shape may surround and abut against the first pillar 151*a* and the second pillar 151*b*, respectively. With such a configuration, the upper portion 151 of the tower body has simpler structure and the manufacturing cost is lower. And the reinforcing body 310 may be firmly mounted onto the upper portion 151 of the tower body. The reinforcing body 310 abuts against the first pillar 151*a* and the second pillar 151*b* on the outer sides respectively, which may provide a good reinforcing effect to the first pillar 151*a* and the second pillar 151*b*. The electronic card 500 may move along the transverse direction Y-Y in use, and the reinforcing body 310 may sustain the transverse force applied upon the first pillar 151*a* and the second pillar 151*b*, thereby ensuring the strength of the upper portion 151 of the tower body and maintaining the stability of the electronic card 500.

Exemplarily, along the transverse direction Y-Y, both the first pillar 151*a* and the second pillar 151*b* are spaced apart from the outer side surface of the lower portion 152 of the tower body, as shown in FIGS. 5-6. In this way, both sides of the U shape can be embedded into the upper portion 151 of the tower body, and may be flush with the outer side surface of the lower portion 152 of the tower body, respectively. Such a configuration enables adding the reinforcing body 310 without increasing the transverse dimension of the tower 120.

Exemplarily, the reinforcing member 300 may further include a front wall 320*a* and a front wall 320*b*, as shown in FIG. 9. The front wall 320*a* and 320*b* may extend from the edges of the opening 301 of the U shape toward the inner side of the opening 301, respectively. In this way, the reinforcing member 300 can form a structure encircling the tower 120, which causes the strengthen and impact resistance of the tower 120 to be further improved. In order to accommodate the front walls 320*a* and 320*b*, as shown in FIGS. 5-6, the upper portion 151 of the tower body further includes a third pillar 151*e* and a fourth pillar 151*f*. The third pillar 151*e* and the fourth pillar 151*f* are spaced apart from the first pillar 151*a* and the second pillar 151*b*, respectively, along the longitudinal direction X-X. The front wall 320*a* is embedded between the third pillar 151*e* and the first pillar 151*a*, while the front wall 320*b* is embedded between the fourth pillar 151*f* and the second pillar 151*b*. Alternatively, the dimensions of the first pillar 151*a* and the second pillar 151*b* may be increased along the longitudinal direction X-X toward the inner side of the insulating housing 100, which may increase their mechanical strength. The front walls 320*a* and 320*b* are then exposed. The outer side surfaces of the front walls 320*a* and 320*b* may be flush with the outer side surface of the lower portion 152 of the tower body.

The aforementioned gap 151*d* between the end wall 151*c* and the first pillar 151*a* as well as the second pillar 151*b*, the gaps between the third pillar 151*e* as well as the fourth pillar 151*f* and the first pillar 151*a* as well as the second pillar 151*b*, and the gap between the first pillar 151*a* as well as the second pillar 151*b* and the outer side surfaces of the lower portion 152 of the tower body along the transverse direction Y-Y may be configured for accommodating the reinforcing member 300, which collectively may be referred to as a mounting groove 190. In other embodiments not shown, the mounting groove 190 may also have other forms. For example, the mounting groove may be completely accommodated in the upper portion 151 of the tower body. In this case, the upper portion 151 of the tower body needs to have sufficient space, such as it is feasible for a card edge connector with a regular latch. The reinforcing member 300 may be inserted into the mounting groove 190. The reinforcing member 300 may be inserted into the mounting groove 190 along the vertical direction. Along the vertical direction, the mounting groove 190 may extend to the top surface of tower 120. The reinforcing member 300 may be inserted into the mounting groove 190 from the top, and the insulating housing 100 and the reinforcing member 300 may be manufactured separately and then assembled together, thereby facilitating the manufacturing and mounting, and reducing the cost of the card edge connector.

Optionally, the reinforcing member 300 may be mounted into the tower 120 by sealing the reinforcing member 300 in the tower 120 when the insulating housing 100 is molded, rather than by inserting. However, it may result in a higher cost of processing the insulating shell 100.

Further, a mounting groove 190 may extend to the top surface of the tower 120. The reinforcing member 300 may be inserted into the mounting groove 190 from the top surface. Since the top surface of the tower 120 is the side where the electronic card 500 is inserted into the slot 181, and this side has a larger view and operating space, so that it may be more convenient for the operation of inserting the reinforcing member 300 from the top surface into the mounting groove 190. And, from the top surface, it is able to check whether the reinforcing member 300 is properly inserted into the mounting groove 190.

Exemplarily, the reinforcing member 300 may also include a first hook 361 and a second hook 362 protruding from the bottom of the front walls 320*a* and 320*b* along the second vertical direction Z2, and a third hook 363 protruding from the reinforcing body 310 along the second vertical direction Z2, as shown in FIG. 9. The first hook 361 and the second hook 362 may be disposed at opposite sides of the slot 181 opposed to each other in the transverse direction Y-Y. The third hook 363 may be disposed at the outer side of the slot 181 along the longitudinal direction X-X. The bottom of the mounting groove 190 may have a first step 194 and a second step 195. The first step 194 and the second step 195 may be spaced apart along the transverse direction Y-Y, and the first step 194 and the second step 195 are formed with a first recess 191 and a second recess 192, respectively. A third recess 193 may be formed between the first step 194 and the second step 195. The first recess 191, the second recess 192 and the third recess 193 may or may not perforate through to the bottom surface of the tower 120. The first step 194 and the second step 195 may be disposed at opposite sides of the slot 181. Exemplarily, the first step 194 and the second step 195 may be disposed at the outer sides of the first pillar 151*a* and the second pillar 151*b* in the transverse direction Y-Y, respectively. The first hook 361, the second hook 362, and the third hook 363 may be adaptive to the first recess 191, the second recess 192, and the third recess 193, correspondingly. The first step 194 and the second step 195 may be the same or different. By disposing the first recess 191, the second recess 192 and the third recess 193, the dimension of the reinforcing member 300 along the vertical direction can be extended as long as possible to protect the tower 120 from deformation or cracking. Since the limit recess 210 is provided in the latch 200 and the extension 130 is provided on the tower 120, the tower 120 has sufficient space along the vertical direction to allow for the third hook 363.

Further, the third recess 193 may be deeper than the first recess 191 and the second recess 192. In this way, the insertion depth of the main part of the reinforcing member 300 can be increased which is benefit for increasing the vertical height of the opening 301 to provide an larger interference force from the reinforcing member 300, so as to protect the tower 120 from deformation or cracking to a greater extent. Optionally, the third recess 193 may be shallower than or equal to the first recess 191 and the second recess 192 in depth.

Exemplarily, the reinforcing member 300 may further include an elastic portion 330, as shown in FIG. 9. The elastic portion 330 may be bent from the top of the reinforcing body 310 in a direction away from the slot 181. The radius of curvature of the elastic portion 330 may be arbitrary. The elastic portion 330 may abut against the mounting groove 190. The elastic portion 330 may play a guiding role. When the electronic card 500 is inserted into the slot 181 along the vertical direction, the elastic portion 330 may prevent the electronic card 500 from being scratched, and the electronic card 500 can be effectively inserted into the slot 181.

Optionally, the reinforcing member 300 may also include a first side wall 341 and a second side wall 342. The first side wall 341 and the second side wall 342 may extend upward from the reinforcing body 310 and the front walls 320*a* and 320*b*. The first side wall 341 and the second side wall 342 may be the same or different. Exemplarily, the first side wall 341 and the second side wall 342 may be assembled with the reinforcing body 310 and the front walls 320*a* and 320*b* by the means like soldering, bonding, etc., or may be integrally formed with the reinforcing body 310 and the front walls 320*a* and 320*b*. The first side wall 341 and the second side wall 342 can increase the vertical dimension of the reinforcing member 300 as much as possible to enhance the resistivity of the reinforcing member 300 to impact forces, thus the tower 120 can be better protected from deformation or cracking.

Optionally, chamfers 321 may be provided at the tops of the first extension 341 and the second extension 342. The chamfers 321 may play a guiding role. When the electronic card 500 is inserted into the slot 181 along the vertical direction, the chamfers 321 can prevent the electronic card 500 from being scratched, such that the electronic card 500 can be effectively inserted into the slot 181.

In FIG. 3, the latch 200 is in the locked position and most of the reinforcing member 300 is wrapped within the corresponding latch 200 and the tower 120. Thus, the reinforcing member 300 can be less contaminated by external dust, etc., so as to ensure its structural strength thereby better protecting the tower 120.

The present disclosure has been described through the above embodiments, but it should be understood that a variety of variations, modifications and improvements may be made by a person skilled in the art according to the teaching of the present disclosure, and these variations, modifications and improvements all fall within the spirit of the present disclosure and the claimed scope of protection of the present disclosure. The scope of protection of the present disclosure is defined by the appended claims and its equivalent scope. The above embodiments are only for the purpose of illustration and description, and are not intended to limit the present disclosure to the scope of the described embodiments.

In the description of the present disclosure, it is to be understood that orientation or positional relationships indicated by orientation words "front", "rear", "upper", "lower", "left", "right", "transverse direction", "vertical direction", "perpendicular", "horizontal", "top", "bottom" and the like usually are shown based on the accompanying drawings, only for the purposes of the ease in describing the present disclosure and simplification of its descriptions. Unless stated to the contrary, these orientation words do not indicate or imply that the specified apparatus or element has to be for example located, and structured and operated in a specific direction, and therefore, should not be understood as limitations to the present disclosure. The orientation words "inside" and "outside" refer to the inside and outside relative to the contour of each component itself.

Various changes may be made to the illustrative structures shown and described herein. For example, the card edge connector may be used as any suitable electrical connector, such as backplane connector, daughter card connector, stacking connector, Mezzanine connector, I/O connector, chip socket, Gen Z connector, etc.

Moreover, although many creative aspects have been described above with reference to the vertical connector, it should be understood that the aspects of the present disclosure are not limited to these. Any one of the creative features, whether alone or combined with one or more other creative features, can also be used for other types of card edge connectors, such as coplanar connectors, and the like.

For facilitating description, the spatial relative terms such as "on", "above", "on an upper surface of" and "upper" may be used here to describe a spatial position relationship between one or more components or features and other components or features shown in the accompanying drawings. It should be understood that the spatial relative terms not only include the orientations of the components shown in the accompanying drawings, but also include different orientations in use or operation. For example, if the component in the accompanying drawings is turned upside down completely, the component "above other components or features" or "on other components or features" will include the case where the component is "below other components or features" or "under other components or features". Thus, the exemplary term "above" can encompass both the orientations of "above" and "below". In addition, these components or features may be otherwise oriented (for example rotated by 90 degrees or other angles) and the present disclosure is intended to include all these cases.

It should be noted that the terms used herein are only for describing specific embodiments, and are not intended to limit the exemplary embodiments according to the present application. As used herein, an expression of a singular form includes an expression of a plural form unless otherwise indicated. In addition, it should also be understood that when the terms "including" and/or "comprising" are used herein, it indicates the presence of features, steps, operations, parts, components and/or combinations thereof.

It should be noted that the terms "first", "second" and the like in the description and claims, as well as the above accompanying drawings, of the present disclosure are used to distinguish similar objects, but not necessarily used to describe a specific order or precedence order. It should be understood that ordinal numbers used in this way can be interchanged as appropriate, so that the embodiments of the present disclosure described herein can be implemented in a sequence other than those illustrated or described herein.

What is claimed is:

1. A card edge connector, comprising:
a housing comprising a body, a tower narrower than the body in a transverse direction, and a slot extending from the body to the tower, the tower comprising:
a tower body protruding from an end of the body of the housing, and
an extension protruding from the tower body away from the slot; and
a latch comprising:
a lower portion pivotably connected to the body of the housing such that the latch can move between a locked position and an unlocked position, and
an upper portion extending from the lower portion, the upper portion comprising a recess configured to receive the extension of the tower when the latch is in the locked position.

2. The card edge connector of claim 1, wherein:
the extension of the tower comprises concave surfaces on opposite sides;
the upper portion of the latch comprises convex surfaces disposed in the recess; and
the convex surfaces of the upper portion of the latch are configured to snap into respective concave surfaces of the extension of the tower when the latch is in the locked position.

3. The card edge connector of claim 1, wherein:
the upper portion of the latch comprises a pair of beams disposed on opposite sides of the recess; and
the pair of beams comprises convex surfaces.

4. The card edge connector of claim 1, wherein:
the extension of the tower comprises a pair of protrusions spaced apart;
the upper portion of the latch comprises a pair of bulges; and
each of the pair of protrusions of the tower is configured to engage a respective one of the pair of bulges when the latch is in the locked position.

5. The card edge connector of claim 4, wherein:
the extension of the tower comprises a pair of reinforcing walls; and
each of the pair of reinforcing walls is connected to the tower body and a respective one of the pair of protrusions.

6. The card edge connector of claim 5, wherein:
the pair of reinforcing walls of the extension of the tower comprise surfaces facing the latch and inclined toward the slot of the housing;
the latch comprises slanted surfaces disposed in the recess; and
each of the surfaces of the pair of reinforcing walls of the extension of the tower is configured to abut against a respective one of the slanted surfaces of the latch when the latch is in the locked position.

7. The card edge connector of claim 1, wherein:
the upper portion of the latch comprises a pair of bulges;
the extension of the tower comprises a pair of grooves on opposite sides; and
the pair of grooves are configured to receive respective ones of the pair of bulges.

8. The card edge connector of claim 1, wherein:
the tower body is integrally formed with the body of the housing.

9. The card edge connector of claim 1, wherein:
the extension is a separate component, and/or comprises different material than the tower body.

10. A latch for a card edge connector, the latch comprising:
a lower portion comprising a pair of pivot portions configured to engage matching recesses of a housing for the card edge connector such that the latch is pivotably connected to the housing;
an upper portion extending from the lower portion, the upper portion comprising a recess and a pair of bulges disposed in the recess; and
a heat dissipation hole extending through at least a portion of the lower portion and a portion of the upper portion.

11. The latch of claim 10, wherein:
each bulge of the pair of bulges comprises a first bulge sidewall and a second bulge sidewall; and
the first bulge sidewall and the second bulge sidewall extend at an angle to each other.

12. The latch of claim 11, wherein:
each bulge of the pair of bulges comprises a first surface joining the first bulge sidewall and the second bulge sidewall, and a second surface opposite to the first surface and joining the first bulge sidewall and the second bulge sidewall; and
the second surface inclines toward the first surface.

13. A card edge connector comprising:
a housing comprising a body, a tower, and a slot extending from the body to the tower, the tower comprising a tower body protruding from an end of the body of the housing and an extension protruding from the tower body away from the slot;
a reinforcing member between the tower body and the extension of the tower; and
a latch pivotably connected to the body of the housing, the latch comprising a recess configured to receive the extension of the tower, wherein:

the tower body comprises a lower portion and an upper portion extending from the lower portion, the lower portion extending toward the latch beyond the upper portion; and the extension is connected to both the upper portion and the lower portion of the tower body.

14. The card edge connector of claim 13, wherein, for the housing:

the tower is narrower than the body in a transverse direction.

15. The card edge connector of claim 13, wherein:

the reinforcing member comprises a reinforcing body;

a section of the reinforcing member is in a U shape; and an end of the slot extends into an opening of the U shape.

16. The card edge connector of claim 15, wherein:

the reinforcing member is inserted between the upper portion of the tower body and the extension.

17. The card edge connector of claim 16, wherein:

the upper portion of the tower body comprises:

a first pillar and a second pillar disposed on opposite sides of the slot, and an end wall separated from the first pillar and the second pillar by a gap;

the extension of the tower extends from the end wall of the upper portion of the tower body; and a bottom of the U shape is inserted into the gap, and two sides of the U shape respectively surround and abut against the first pillar and the second pillar.

18. The card edge connector of claim 17, wherein:

the first pillar and the second pillar are offset from outer side surfaces of the lower portion of the tower body such that the two sides of the U shape are flush with the outer side surfaces of the lower portion of the tower body.

19. The card edge connector of claim 18, wherein:

the reinforcing member further comprises a pair of front walls; and the pair of front walls extend from two ends of the U shape toward each other.

20. The card edge connector of claim 19, wherein:

the reinforcing member further comprises:

a first hook and a second hook protruding from the front walls, and a third hook protruding from a bottom of the U shape; and the tower comprises a first recess, a second recess, and a third recess configured to receive the first hook, the second hook, and the third hook, respectively.

* * * * *